(12) United States Patent
Shimamura et al.

(10) Patent No.: US 10,761,884 B2
(45) Date of Patent: Sep. 1, 2020

(54) CONTROL DEVICE FOR OPERATING MULTIPLE TYPES OF PROGRAMS IN DIFFERENT EXECUTION FORMATS

(71) Applicant: OMRON Corporation, Kyoto (JP)

(72) Inventors: Junji Shimamura, Takatsuki (JP); Tetsushi Jakunen, Kusatsu (JP); Tomonori Shimamura, Otsu (JP); Eiji Yamamoto, Kyoto (JP); Masahiko Nakano, Ritto (JP)

(73) Assignee: OMRON Corporation, Kyoto (JP)

( * ) Notice: Subject to any disclaimer, the term of this patent is extended or adjusted under 35 U.S.C. 154(b) by 207 days.

(21) Appl. No.: 16/004,432

(22) Filed: Jun. 11, 2018

(65) Prior Publication Data
US 2019/0095247 A1    Mar. 28, 2019

(30) Foreign Application Priority Data
Sep. 26, 2017  (JP) ................ 2017-185146

(51) Int. Cl.
*G05B 19/414* (2006.01)
*G05B 19/408* (2006.01)
(Continued)

(52) U.S. Cl.
CPC ......... *G06F 9/4881* (2013.01); *G05B 19/408* (2013.01); *G05B 19/4145* (2013.01);
(Continued)

(58) Field of Classification Search
None
See application file for complete search history.

(56) References Cited

U.S. PATENT DOCUMENTS 6,594,541 B1 * 7/2003 Wucherer ............ G05B 19/042
  700/13
6,961,720 B1 * 11/2005 Nelken ................. G06F 9/4881
  706/47

(Continued)

FOREIGN PATENT DOCUMENTS

JP  2001027904       1/2001
JP  2001027904 A *   1/2001
(Continued)

OTHER PUBLICATIONS

"Search Report of Europe Counterpart Application", dated Apr. 11, 2019, p. 1-p. 7.

(Continued)

*Primary Examiner* — Abu Zar Ghaffari
(74) *Attorney, Agent, or Firm* — JCIPRNET

(57) ABSTRACT

A control device includes at least a first task that has a first priority including processing execution performed by a program execution part and a command calculation part, a second task that has a second priority, lower than the first priority, including processing execution performed by a parsing part, and a third task that has a third priority including execution of a processing content different from the first task and the second task are set in a scheduler. The control device further includes a priority changing part monitoring a processing state of the parsing part, and when the processing state of the parsing part meets a predetermined condition, changing the second priority set to the second task corresponding to the condition.

7 Claims, 17 Drawing Sheets

(51) Int. Cl.
*G06F 9/50* (2006.01)
*G06F 9/48* (2006.01)
*G05B 19/418* (2006.01)

(52) U.S. Cl.
CPC ... *G05B 19/4148* (2013.01); *G05B 19/41865* (2013.01); *G06F 9/505* (2013.01); *G05B 2219/1215* (2013.01); *G05B 2219/15079* (2013.01); *G05B 2219/23275* (2013.01); *G05B 2219/34287* (2013.01)

(56) References Cited

U.S. PATENT DOCUMENTS

| | | | | |
|---|---|---|---|---|
| 7,469,405 | B2* | 12/2008 | Foulger | G06F 9/4881 709/208 |
| 8,924,981 | B1* | 12/2014 | Brown | G06F 16/24532 718/103 |
| 9,483,306 | B2* | 11/2016 | Tajima | G06F 9/4881 |
| 2002/0198617 | A1* | 12/2002 | Baek | G06Q 10/06 700/101 |
| 2003/0037091 | A1* | 2/2003 | Nishimura | G06F 9/4881 718/103 |
| 2008/0201697 | A1* | 8/2008 | Matsa | G06F 40/205 717/143 |
| 2008/0244592 | A1* | 10/2008 | Uchihira | G06F 9/4881 718/103 |
| 2012/0079494 | A1* | 3/2012 | Sandstrom | G06F 9/4881 718/104 |
| 2014/0012402 | A1* | 1/2014 | Nishiyama | G05B 19/05 700/86 |
| 2015/0135185 | A1* | 5/2015 | Sirota | G06F 9/5061 718/103 |
| 2017/0146967 | A1* | 5/2017 | Hatanaka | G05B 19/0421 |
| 2017/0248933 | A1* | 8/2017 | Saijo | G05B 19/182 |
| 2017/0255490 | A1* | 9/2017 | Aberg | G06F 9/4887 |
| 2018/0032055 | A1* | 2/2018 | Janssen | G05B 19/408 |
| 2019/0286478 | A1* | 9/2019 | Sengupta | G06F 9/4881 |

FOREIGN PATENT DOCUMENTS

| | | | |
|---|---|---|---|
| JP | 2001034320 | 2/2001 | |
| JP | 2004152322 | 5/2004 | |
| JP | 2010033150 | 2/2010 | |
| JP | 2015176191 | 10/2015 | |
| JP | 2016012221 | 1/2016 | |
| JP | 2016092544 | 5/2016 | |
| JP | 2016092544 A * | 5/2016 | ............ B25J 9/0084 |
| WO | WO-2019061466 A1 * | 4/2019 | ............ G05D 1/0808 |

OTHER PUBLICATIONS

"Office Action of Japan Counterpart Application", dated Mar. 10, 2020, with English translation thereof, p. 1-p. 9.

* cited by examiner

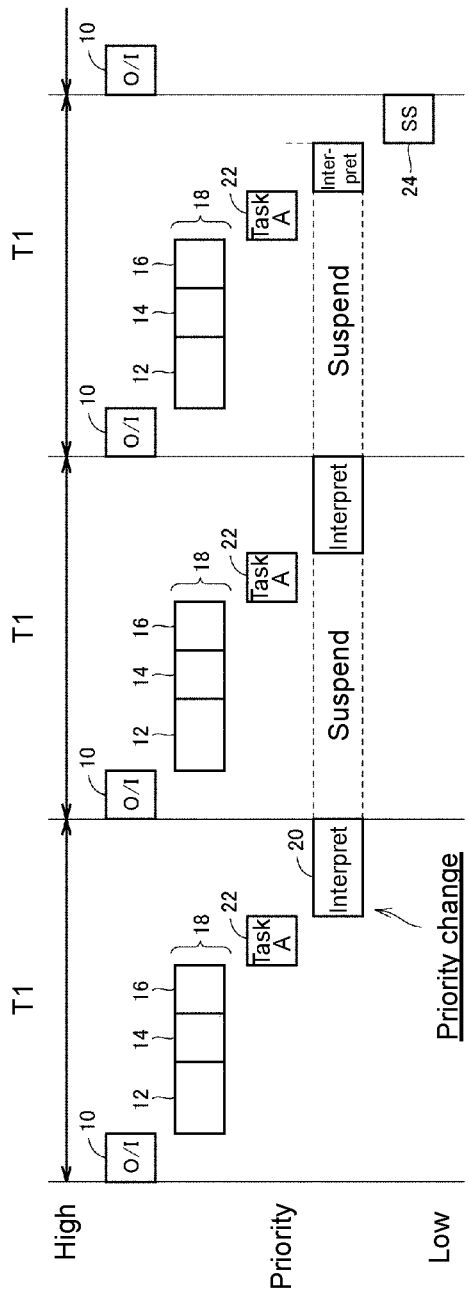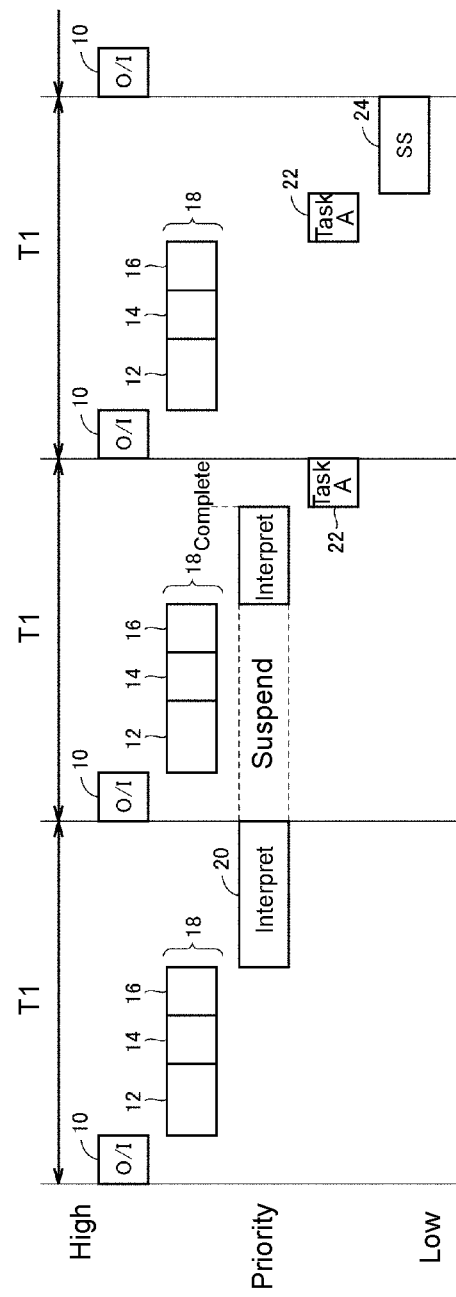
FIG. 1A
FIG. 1B

| Name | value |
|---|---|
| _CNC_ServiceExecCount | 2733726 |
| _CNC_ServiceLastExecTime | 0.261ms |
| _CNC_ServiceMaxExecTime | 0.357ms |
| _CNC_ServiceMinExecTime | 0.244ms |
| _CNC_ServiceExceeded | False |
| _CNC_ServiceExceedCount | 0 |

600

601 — _CNC_ServiceExecCount
602 — _CNC_ServiceLastExecTime
603 — _CNC_ServiceMaxExecTime
604 — _CNC_ServiceMinExecTime
605 — _CNC_ServiceExceeded
606 — _CNC_ServiceExceedCount

FIG. 8

CONTROL DEVICE FOR OPERATING MULTIPLE TYPES OF PROGRAMS IN DIFFERENT EXECUTION FORMATS

CROSS-REFERENCE TO RELATED APPLICATION

This application claims the priority benefit of Japan application serial no. 2017-185146, filed on Sep. 26, 2017. The entirety of the above-mentioned patent application is hereby incorporated by reference herein and made a part of this specification.

BACKGROUND

Technical Field

The invention relates to a control device for controlling a control object.

Description of Related Art

Various FA (Factory Automation) technologies have been used widely at production sites. Such FA systems may include not only control devices such as PLC (programmable logic controller) but also various actuators that are capable of performing advanced operations such as CNC (computer numerical control) and robot. Such FA systems tend to be larger in scale.

For example, Japanese Laid-open Patent Application No. 2001-027904 discloses a numerical control system that can increase the number of axes under control by connecting multiple CNC devices, and synchronize the CNC devices. In this numerical control system, a master unit and one or more slave units are connected via a cable. The master unit and the slave units each have a PMC processor and a CNC processor for executing a ladder program.

In addition, Japanese Laid-open Patent Application No. 2016-092544 discloses a control system that controls a first control object by a master control device and controls a second control object, different from the first control object, by a slave control device connected to the master control device via a network. This control system includes the master control device and the slave control device. Apart from the controller that has an arithmetic processing part, the master control device and the slave control device each include a robot controller having another arithmetic processing part.

As the ICT (information and communication technology) advances in recent years, the processing capability of control devices is also improving dramatically. There is also a need to realize the FA system, which has been realized with use of multiple dedicated devices in the related art, with fewer control devices.

In the configurations disclosed in the aforementioned patent documents, a plurality of processors or arithmetic processing parts are dispersively arranged, and in order to achieve synchronous processing between the processors or arithmetic processing parts, the configurations may become redundant.

Furthermore, for realizing multiple types of programs (e.g., ladder program, CNC program, robot program, etc.) in different execution formats with one single control device, it is necessary to efficiently use the limited processing resources. The invention thus provides a control device.

SUMMARY

According to an embodiment of the disclosure, a control device having one or more processors is provided. The control device includes: a storage part storing a first program that is scanned as a whole for every execution and a second program that is executed sequentially; a program execution part executing the first program at every first cycle to output a first control command; a parsing part parsing at least a part of the second program at every second cycle, which is longer than the first cycle, to sequentially generate an internal command; a command calculation part outputting a second control command at every first cycle according to the internal command generated by the parsing part; and a scheduler allocating a processor resource to one or more tasks based on a preset priority. At least a first task that has a first priority including processing execution performed by the program execution part and the command calculation part, a second task that has a second priority, lower than the first priority, including processing execution performed by the parsing part, and a third task that has a third priority including execution of a processing content different from the first task and the second task are set in the scheduler. The control device further includes a priority changing part monitoring a processing state of the parsing part, and when the processing state of the parsing part meets a predetermined condition, changing the second priority that has been set to the second task according to the condition.

BRIEF DESCRIPTION OF THE DRAWINGS

FIG. 1A and FIG. 1B are time charts for illustrating the outline of processing in the control device according to the embodiment.

FIG. 8 is a diagram showing an example of the variable list that shows the time required for processing execution in the control device according to the embodiment.

DESCRIPTION OF THE EMBODIMENTS

Figure 2:
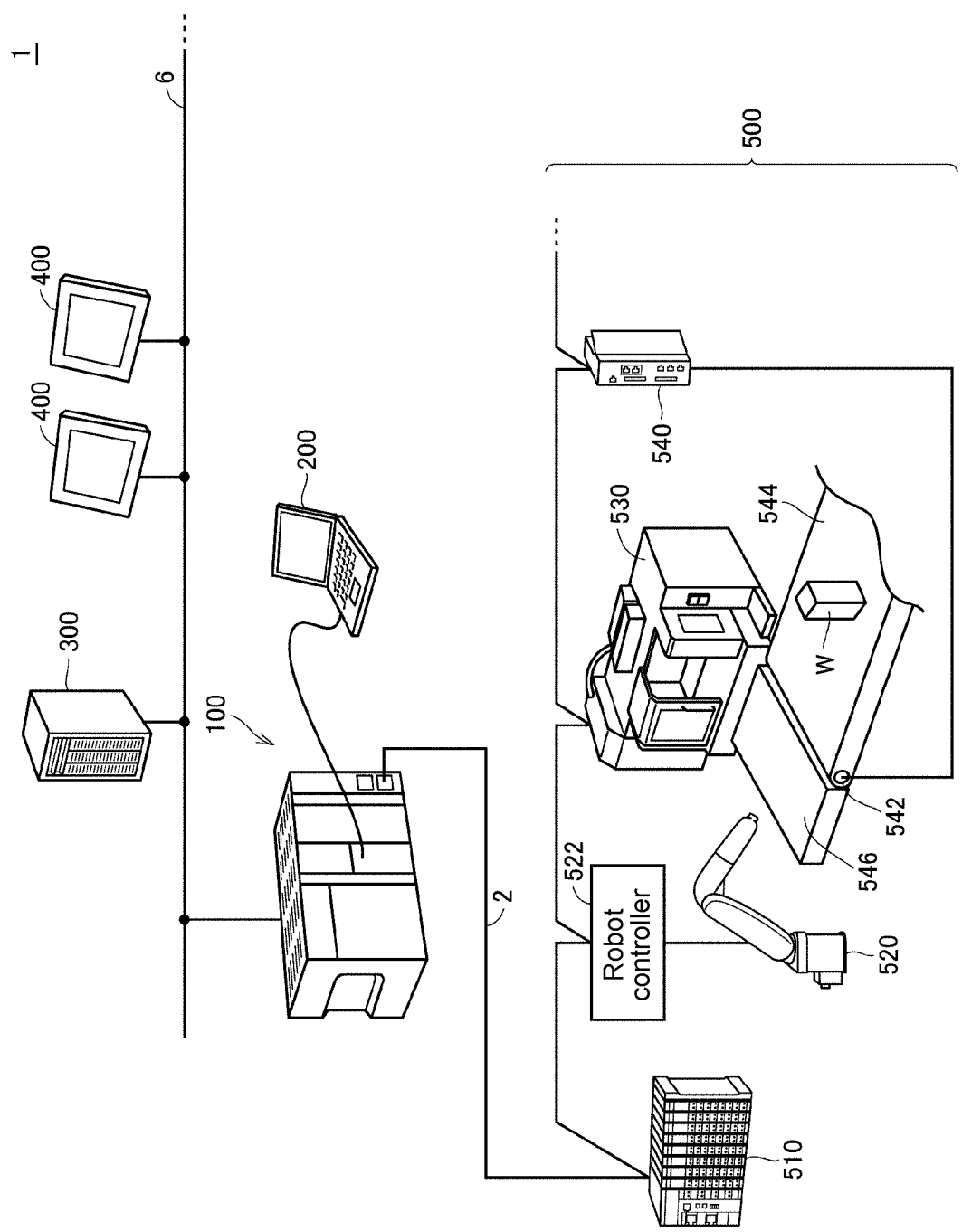
FIG. 2 is a schematic diagram showing an example of the overall configuration of the control system according to the embodiment.

According to the disclosure, in the case where multiple tasks share a common processor resource, it is possible to prevent the situation that the internal command serving as the source for generating the control command is not generated in time, so as to guarantee output of the control commands according to the first program and the second program at every first cycle.

According to an embodiment of the disclosure, the priority changing part may determine the processing state of the parsing part based on information that indicates a load related to a generation process of the internal command performed by the parsing part.

According to the disclosure, since it is possible to evaluate the load state of the parsing part subject to the priority change substantially, the stability of the priority changing process can be improved.

According to an embodiment of the disclosure, the information that indicates the load may include a time required for parsing of the second program performed by the parsing part.

According to the disclosure, since it is possible to objectively or quantitatively evaluate the load state of parsing of the second program performed by the parsing part, the priority can be raised before the load of the parsing part becomes excessive, so as to prevent occurrence of the situation that the internal command is not generated in time.

According to an embodiment of the disclosure, the information that indicates the load may include information of whether the time required for parsing of the second program performed by the parsing part exceeds a length of the second cycle.

According to the disclosure, since the priority is changed based on the fact that the parsing of the second program performed by the parsing part exceeds the original cycle, the situation of unnecessary change of the priority can be prevented.

According to an embodiment of the disclosure, the parsing part may be configured to parse the second program to calculate a passing point on a trajectory and generate the internal command based on the calculated passing point. The information that indicates the load may include a number of passing points that the parsing part calculates in advance for generating the internal command.

According to the disclosure, it is possible to evaluate the processing load of the parsing of the second program performed by the parsing part, and prevent the situation that the internal command is not generated in time.

According to an embodiment of the disclosure, the information that indicates the load may include a number of internal commands, which have not yet been processed by the command calculation part, among the internal commands generated by the parsing part.

According to the disclosure, it is possible to prevent the situation that the generation of the internal command does not catch up and causes the output of the control command performed by the parsing part to be suspended.

According to an embodiment of the disclosure, the information that indicates the load may include a special command described in the second program.

According to the disclosure, since it is possible to directly instruct processing of a specific command among the commands described in the second program with a higher priority, the parsing of the second program and the generation of the internal command can be realized more reliably.

According to an embodiment of the disclosure, the priority changing part may raise the second priority that has been set to the second task, and then restore the second priority when another predetermined condition is met.

According to the disclosure, more processor resource is allocated to the parsing part for parsing the second program only when required. When not required, the parsing part does not occupy the processor resource and the processor resource can be allocated to other tasks.

According to an embodiment of the disclosure, the parsing part may be configured to execute parsing on a plurality of the second programs respectively to sequentially generate respective internal commands. The priority changing part may change priorities of a plurality of the second tasks associated with the parsing of the second programs.

According to the disclosure, in the control device, when the control according to multiple second programs is executed in parallel, arbitration between the priorities of the second programs can be performed.

According to the disclosure, it is possible to efficiently operate multiple types of programs in different execution formats on one single control device.

Embodiments of the invention are described in detail hereinafter with reference to the figures. In the figures, identical or corresponding parts are denoted by the same reference numerals and descriptions thereof will not be repeated.

A. Example of Application

First, an example of the situation, to which the invention is applied, is described with reference to FIG. 1A and FIG. 1B. FIG. 1A and FIG. 1B are time charts for illustrating the outline of processing in a control device 100 according to the embodiment.

Referring to FIG. 1A and FIG. 1B, in the control device 100 according to the embodiment, at least a first program that is scanned as a whole in each execution and a second program that is executed sequentially are both executed.

In the embodiment, it is assumed that an "IEC program" is an example of the first program. The control device 100 executes the IEC program at every predetermined control cycle T1 (first cycle) to output a control command.

In this specification, the IEC program is a concept that covers a program that can be scanned as a whole in each execution and output a control command in each execution. The IEC program includes a program composed of one or more instructions that are described according to the international standard IEC61131-3 defined by the International Electrotechnical Commission (IEC). The IEC program may include a sequence instruction and/or a motion instruction. Nevertheless, the IEC program is not limited to the instructions defined in accordance with the international standard IEC61131-3, and may include an instruction that is defined independently by the manufacturer or vendor of the PLC (programmable logic controller). Thus, the IEC program is suitable for control that requires immediacy and high speed.

Since the IEC program may be created by the user according to the control object or application, in the following descriptions, the IEC program is also referred to as a "user program" for convenience.

In this specification, the "sequence instruction" is a term that covers one or more instructions described by one or more logic circuits for calculating input values, output values, internal values, etc. In one control cycle T1, the "sequence instruction" is executed from the beginning to the end, and in the next control cycle T1, the "sequence instruction" is executed from the beginning to the end again.

In this specification, the "motion instruction" is a term that covers one or more instructions for calculating numerical values, such as position, speed, acceleration, jerk, angle, angular speed, angular acceleration, angular jerk, etc., as control commands for an actuator, such as a servo motor. The "motion instruction" is also executed from the beginning to the end of the program (motion program) of the motion instruction, as described by a function block or a numerical expression, in one control cycle T1.

The control command that is outputted by executing the user program at every control cycle T1 typically includes on/off of the digital output determined according to the sequence instruction, and an analog output calculated according to the motion instruction.

In the embodiment, it is assumed that an "application program" is an example of the second program.

In this specification, the "application program" includes any program that is executed sequentially. Typically, the "application program" includes a program that is described in any language executable in an interpreter system, which sequentially executes the program line by line. In the following descriptions, a program that describes the behavior in CNC (computer numerical control) (or referred to as a "NC program" hereinafter) is given as an example of the "application program". Moreover, a program for controlling a robot is given as another example of the "application program".

The NC program is described according to a predetermined language. As an example, the NC program is described using "G language", and the program for controlling a robot is usually described using a dedicated robot language.

In the following descriptions, for example, including the device or machine, including the control thereof, that performs a particular process or operation using CNC (computer numerical control) and/or a robot may be referred to as a "control application".

The control device 100 parses at least a part of the application program at every application execution cycle T2 (second cycle), which is longer than the control cycle T1 (first cycle), to sequentially generate an internal command, and outputs a control command at every control cycle T1 according to the generated internal command. Thus, the control device 100 parses the application program to sequentially generate the internal command, and outputs the control command at every control cycle T1 based on the internal command.

Since the sequentially executed application program is inherently unsuitable for processing for outputting the control command at a fixed cycle, the internal command suitable for output of the control command at every control cycle T1 is generated. Such an internal command may be any code if it can output the control command at every control cycle T1. Typically, the internal command may be one or more functions with time as an input variable, or one or more instructions with time as an argument.

In the control device 100, a process of outputting the control command according to the sequence instruction included in the user program, a process of outputting the control command according to the motion instruction included in the user program, a process of parsing the application program to generate the internal command, and a process of outputting the control command according to the internal command are executed. In addition to these processes, other related processes are also executed in the control device 100. That is, in the control device 100, a plurality of processes are executed using common processing resources.

Execution of such processes is managed by a function called a scheduler. The scheduler allocates the processing time (or referred to as "processor resource" hereinafter) of one or more processors possessed by the control device 100 to the target processes.

In the embodiment, allocation of the processor resource is managed in units of "tasks" composed of one or more processes. Priority is preset for each task, and the scheduler allocates the processor resource to one or more tasks based on the preset priorities.

An execution cycle may be set for each task. When the execution cycle is set, the scheduler triggers the process set in the task in accordance with the preset execution cycle.

FIG. 1A shows an example of five tasks (first to fifth tasks) set for each priority.

The first task 10 includes an input/output refresh process (marked as "O/T" in FIG. 1A and FIG. 1B) for updating the input value and the control command with a field.

The second task 18 includes a sequence instruction execution process 12, an output process 14 for outputting a control command according to the application program, and an output process 16 for outputting a control command according to the motion instruction included in the user program. In the scheduler, execution of the application program and processing execution of the control command output are set as the second task 18 that has a relatively high priority.

The first task 10 and the second task 18 are triggered at every control cycle T1. Therefore, relatively high priorities are set to the first task 10 and the second task 18. In the following descriptions, the first task 10 and the second task 18 are also referred to as "high priority tasks".

The third task 20 includes a process of parsing the application program to sequentially generate an internal command. That is, in the scheduler, processing execution of parsing of the application program is set as the third task 20 that has a relatively low priority.

The fourth task 22 includes any process provided by the control device 100. That is, in the scheduler, execution of processing contents different from the second task 18 and the third task 20 is set as the fourth task 22 that has a relatively low priority.

The fifth task 24 includes a process such as data communication between the control device 100 and an external device (or referred to as "system service" hereinafter).

The third task 20, the fourth task 22, and the fifth task 24 are executed during a period when the high priority task is not executed. In the following descriptions, the third task 20, the fourth task 22, and the fifth task 24 are also referred to as "low priority tasks".

Priorities are respectively set for the first to fifth tasks, and the processor resource is allocated according to the set priorities.

FIG. 1A shows an example where a higher priority than the third task 20 is set for the fourth task 22. In the example shown in FIG. 1A, the first task 10 and the second task 18 are repeatedly executed at every control cycle T1. In each control cycle T1, during the period when the first task 10 and the second task 18 are not executed, the third to fifth tasks are executed according to the priority.

In the example shown in FIG. 1A, the processor resource is allocated to the fourth task 22 at every control cycle T1. On the other hand, the processor resource is allocated to the third task 20 only during the period when none of the first task 10, the second task 18, and the fourth task 22 is executed. Therefore, a time equivalent to three control cycles T1 is required for completing one process of the third task 20. That is, a time that is three times the control cycle T1 is required from the triggering of the third task 20 to the completion of the designated process.

As described above, the process set as the third task 20 is to parse the application program and sequentially generate the internal command, and the sequentially generated internal command is used for outputting the control command.

Thus, in the third task 20, the application program is parsed to generate the internal command, and in the second task 18, the internal command generated in the third task 20 is used sequentially for calculation of the control command (that is, "consumed" at every control cycle T1). That is, there is competition between generation of the internal command performed by the third task 20 and use of the internal command performed by the second task 18.

In the case where sufficient processor resource is allocated to the third task 20, a certain amount of the internal command can be generated in advance before use of the internal command performed by the second task 18. On the other hand, in the case where sufficient processor resource cannot be allocated to the third task 20, use of the internal command performed by the second task 18 comes first, and it may be required to wait for generation of the internal command performed by the third task 20.

Therefore, in the control device 100 according to the embodiment, the processing state of the third task 20 (the parsing process for the application program) is monitored, and when the processing state meets a predetermined condition, the priority that has been set to the third task 20 is changed according to the condition.

For example, in the case where there is no margin for generation of the internal command, the priority set to the third task 20 is raised. On the contrary, when there is a sufficient margin for generation of the internal command, it is possible to lower the priority set to the third task 20.

FIG. 1B shows an example of processing when the priority of the third task 20 is set higher than the priority in the case of FIG. 1A. In FIG. 1B, the priority of the third task 20 is set higher than the priority of the fourth task 22.

In the example shown in FIG. 1B, during the period when none of the first task 10 and the second task 18 are executed, the processor resource is preferentially allocated to the third task 20. As a result, more processor resource is allocated to the third task 20 than in the case of FIG. 1A, and the designated process can be completed in a time, which is twice the control cycle T1, after the third task 20 is triggered. That is, the internal command can be generated from the code to be processed by the application program in a shorter time.

As compared with the case of FIG. 1A, more processor resource can be allocated in FIG. 1B, and in this case, a larger amount of the internal command can be generated by executing one process.

As described above, by dynamically changing the priority of the third task 20, which includes the process of parsing the application program and generating the internal command, according to the processing state, output of the control command at every control cycle T1 can be continued without interruption.

According to the control device 100 of the embodiment, for example, in the case where the CNC machine tool or robot is controlled according to the application program, the control command, such as position and speed, can be outputted in synchronization with the update cycle of the control command according to the user program. Therefore, it is possible to realize control of synchronizing the CNC machine tool and/or the robot and the related conveying device. In this case, by adopting the aforementioned configuration, the internal command for outputting the control command for the CNC machine tool and/or the robot can be generated without a break, and accurate and high-speed control and production can be realized without causing the CNC machine tool and/or the robot to stop temporarily during the processing.

In order to simplify the illustration, FIG. 1A and FIG. 1B show a configuration that one single processor resource is time-divided and allocated to multiple tasks. However, application of the invention is not limited to such an environment and the invention can be applied to other known program execution environments. For example, in a multi-core or multi-processor environment, a plurality of processor resources can be time-divided and allocated to the necessary tasks respectively. In such a case, allocation of the processor resources is still performed based on priority. Thus, by applying the priority change process as described above, it is possible to achieve the same effect as that described above.

Hereinafter, a more detailed configuration and processing of the control device 100 according to the embodiment are described as a more specific example of application of the invention.

B. Example of Overall Configuration of Control System

First, an example of the overall configuration of a control system 1 that includes the control device 100 according to the embodiment is described. FIG. 2 is a schematic diagram showing an example of the overall configuration of the control system 1 according to the embodiment. FIG. 2 shows the control system 1 centered on the control device 100 according to the embodiment.

Referring to FIG. 2, the control device 100 corresponds to an industrial controller that controls control objects, such as various equipment and devices. The control device 100 is a type of computer that executes a control operation which will be described later, and typically the control device 100 may be embodied as a PLC (programmable logic controller). The control device 100 may be connected to various field instruments 500 via a field network 2. The control device 100 exchanges data with one or more field instruments 500 via the field network 2 or the like. Generally, the "field network" is also referred to as a "field bus", but for simplicity, it is collectively referred to as "field network" in the following descriptions. That is to say, the "field network" in this specification is a concept that may cover the "field bus" in addition to the "field network" in a narrow sense.

A bus or network that performs periodic communication, by which data arrival time is guaranteed, may serve as the field network 2. The bus or network that performs periodic communication may be EtherCAT (registered trademark), EtherNet/IP (registered trademark), DeviceNet (registered trademark), CompoNet (registered trademark), etc.

Any field instruments 500 can be connected to the field network 2. The field instruments 500 include an actuator that applies some physical action to a manufacturing device or production line (or collectively referred to as a "field" hereinafter), and an input/output device that exchanges information with the field.

Data is exchanged between the control device 100 and the field instruments 500 via the field network 2, but the exchanged data is updated at a very short cycle of several hundreds of μsec order to several tens of msec order. Such data exchange includes a process of transmitting data collected or generated in the field instrument 500 (or referred to as "input data" hereinafter) to the control device 100, and a process of transmitting data such as the control command for the field instrument 500 (or referred to as "output data" hereinafter) from the control device 100. The process of updating such exchanged data corresponds to the aforementioned "input/output refresh process".

In the configuration example shown in FIG. 2, the field instruments 500 include a remote I/O (input/output) device 510, a robot 520 and a robot controller 522, a CNC machine tool 530, a servo driver 540, and a servo motor 542.

The servo motor 542 drives a conveyor 544 to convey a workpiece W to a worktable 546 disposed in front of the CNC machine tool 530. The robot 520 places the unprocessed workpiece W on the worktable 546 into the CNC machine tool 530, and retrieves the processed workpiece W in the CNC machine tool 530 and places it on the worktable 546.

However, the field instruments 500 are not limited to the aforementioned, and any device (for example, a visual sensor, etc.) for collecting the input data and any device (for example, an inverter device, etc.) for applying some action according to the output data can serve as the field instruments 500.

Typically, the remote I/O device 510 includes a communication coupler for communication via the field network 2, and an input/output part (or referred to as an "I/O unit" hereinafter) for acquiring the input data and outputting the output data.

A device that collects input data of an input relay or various sensors (for example, analog sensor, temperature sensor, vibration sensor, etc.) and a device that applies some action to the fields, such as an output relay, a contactor, a servo driver, and any other actuator, are connected to the remote I/O device 510.

The robot controller 522 performs trajectory calculation and angle calculation of each axis according to the control command (position command or speed command) from the control device 100, and drives the servo motor, etc. that constitutes the robot 520 according to the calculation result.

The CNC machine tool 530 machines any object by controlling a machining center, etc. according to the program that specifies the position, speed, etc. Typically, the CNC machine tool 530 includes machining devices for lathe machining, milling machine, electric discharge machining, etc.

The servo driver 540 drives the servo motor 542 according to the control command (for example, position command or speed command) from the control device 100.

The control device 100 may be connected to another device via a host network 6. The host network 6 may be EtherNet (registered trademark) or EtherNet/IP (registered trademark) which is a general network protocol. More specifically, one or more server devices 300 and one or more display devices 400 may be connected to the host network 6.

It is assumed that a database system, a manufacturing execution system (MES), etc. serve as the server devices 300. The manufacturing execution system acquires information from manufacturing devices or equipment of the control object to monitor and manage the entire production, and can handle order information, quality information, shipping information, etc. Nevertheless, the invention is not limited thereto, and a device that provides an information-based service may be connected to the host network 6. It is assumed that the information-based service is a process for acquiring information from the manufacturing devices or equipment of the control object to perform macro or micro analysis. For example, data mining for extracting some characteristic trend included in the information from the manufacturing devices or equipment of the control object, or a machine learning tool for performing machine learning based on the information from the equipment or machine of the control object is assumed.

The display device 400 receives an operation from the user and outputs a command, etc. corresponding to the user operation to the control device 100, and graphically displays a calculation result, etc. in the control device 100.

Furthermore, a support device 200 can be connected to the control device 100. The support device 200 is a device that supports preparation required for the control device 100 to control the control object 100. Specifically, the support device 200 provides a development environment of the program to be executed by the control device 100 (program creation editing tool, parser, compiler, etc.), a setting environment for setting parameters (configurations) of the control device 100 and various devices connected to the control device 100, a function of outputting the created user program to the control device 100, a function of modifying/changing online the user program to be executed on the control device 100, etc.

C. Example of Hardware Configuration of Control Device

Figure 3:
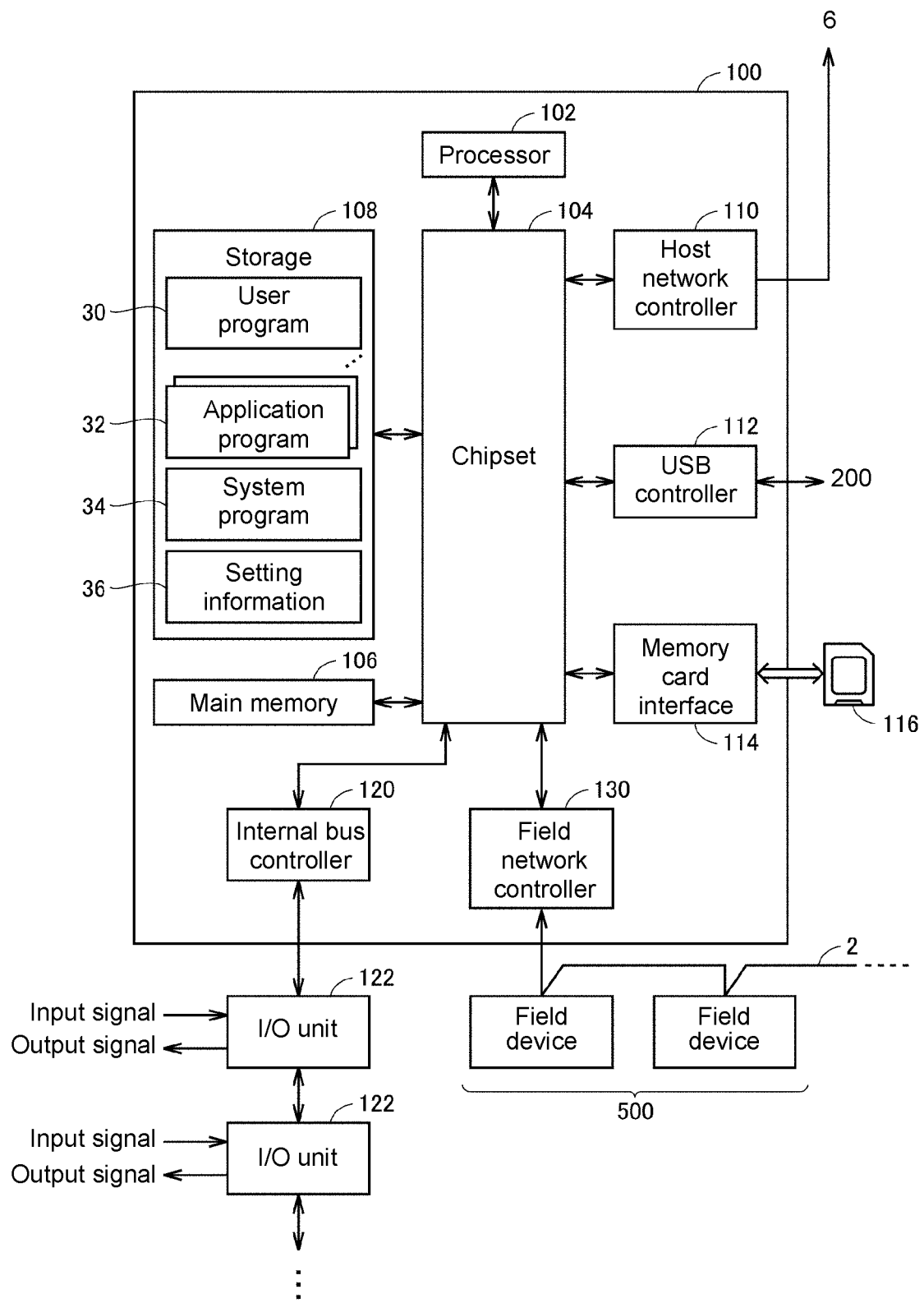
FIG. 3 is a block diagram showing an example of the hardware configuration of the control device according to the embodiment.

Next, an example of the hardware configuration of the control device 100 according to the embodiment will be described. FIG. 3 is a block diagram showing an example of the hardware configuration of the control device 100 according to the embodiment.

Referring to FIG. 3, the control device 100 is an arithmetic processing part called a CPU unit, and includes a processor 102, a chipset 104, a main memory 106, a storage 108, a host network controller 110, a USB (universal serial bus) controller 112, a memory card interface 114, an internal bus controller 120, and a field network controller 130.

The processor 102 comprises a CPU (central processing unit), an MPU (micro processing unit), a GPU (graphics processing unit), etc. A configuration having a plurality of cores may be adopted to serve as the processor 102, and a plurality of processors 102 may be disposed. That is, the control device 100 has one or more processors 102 and/or the processor 102 having one or more cores. The chipset 104 realizes the processing of the entire control device 100 by controlling the processor 102 and the peripheral elements. The main memory 106 comprises a volatile storage device, such as DRAM (dynamic random access memory) or SRAM (static random access memory). The storage 108 comprises for example a non-volatile storage device, such as HDD (hard disk drive) or SSD (solid state drive).

The processor 102 reads various programs stored in the storage 108 and develops them in the main memory 106 to execute them, thereby realizing control corresponding to the control object and various processes which will be described later. In addition to a system program 34 for realizing the basic function, a user program 30 and an application program 32 created corresponding to the manufacturing device or equipment of the control object are stored in the storage 108.

The host network controller 110 controls exchange of data with the server device 300, the display device 400 (see FIG. 3), etc. via the host network 6. The USB controller 112 controls exchange of data with the support device 200 via USB connection.

The memory card interface 114 is configured to allow the memory card 116 to be attached thereto or detached therefrom, and is capable of writing data to the memory card 116 and reading various data (user program, trace data, etc.) from the memory card 116.

The internal bus controller 120 controls the exchange of data with I/O units 122 that are attached to the control device 100. The field network controller 130 controls the exchange of data with field devices via the field network 2.

FIG. 3 shows a configuration example that the required functions are provided by execution of the programs performed by the processor 102. However, a part or all of the provided functions may also be implemented by using a dedicated hardware circuit (for example, ASIC or FPGA). Alternatively, the main parts of the control device 100 may be realized by using hardware according to a general-purpose architecture (for example, an industrial personal computer based on a general-purpose personal computer). In this case, a plurality of OSs (operating systems) for different uses may be executed in parallel by using a virtualization technique, and the required applications may be executed on the respective OSs.

In the control system 1 shown in FIG. 2, the control device 100, the support device 200, and the display device 400 are configured separately. However, it is also possible to adopt a configuration that all or a part of these functions are integrated in one single device.

D. Example of Functional Configuration of Control Device

Figure 4:
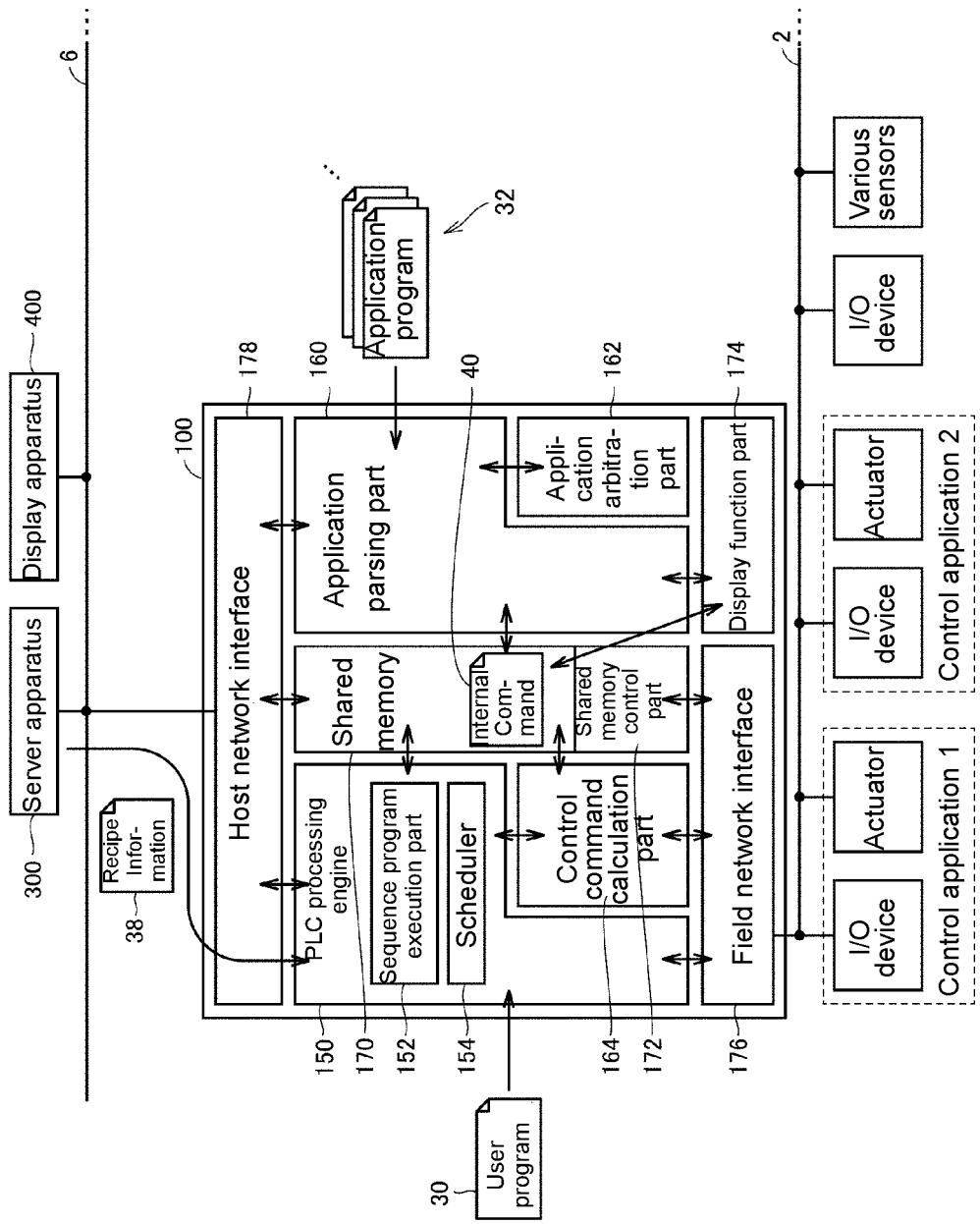
FIG. 4 is a block diagram showing an example of the functional configuration of the control device according to the embodiment.

Next, an example of the functional configuration of the control device 100 according to the embodiment will be described. FIG. 4 is a block diagram showing an example of the functional configuration of the control device 100 according to the embodiment.

FIG. 4 shows a configuration example that the control device 100 controls a control application 1 and a control application 2. Typically, each of the control application 1 and the control application 2 includes I/O devices, such as a relay and a contactor, and various actuators, such as a servo motor. In addition to the control application 1 and the control application 2, other I/O devices and various sensors are also connected to the control device 100 via the field network 2.

The control device 100 receives instructions of start/end of production from the server device 300, etc. connected via the host network 6. The server device 300 may also transmit recipe information 38 (information of the product type or parameters suitable for production) to the control device 100. The control device 100 may also be connected to another control device 100 (not shown) via a network.

Referring to FIG. 4, the control device 100 includes a PLC processing engine 150, an application parsing part 160, an application arbitration part 162, a control command calculation part 164, a shared memory 170, a shared memory control part 172, a display function part 174, a field network interface 176, and a host network interface 178.

The PLC processing engine 150 manages the execution of the user program 30 and the processing of the entire control device 100. More specifically, the PLC processing engine 150 includes a sequence program execution part 152, a scheduler 154, and a priority changing part 156.

The sequence program execution part 152 executes (scans) the user program 30 at every control cycle T1 to output a control command.

The scheduler 154 mediates the order of the processes to be executed in the control device 100, and more specifically, allocates the processor resource to one or more tasks based on the preset priorities.

The priority changing part 156 monitors the processing state of the application parsing part 160, and when the processing state of the application parsing part 160 meets a predetermined condition, the priority changing part 156 changes the priority that has been set to the task, which includes the processing of the application parsing part 160, according to the condition. The priority changing part 156 adjusts the allocation of the processor resource to the priority changing part 156 so that the generation of the internal command performed by the application parsing part 160 is executed with a margin.

The priority changing part 156 has condition setting information 158 for changing the priority. The condition setting information 158 includes a condition and a content of a priority changing process when the condition is met, as described later.

The application parsing part 160 parses at least a part of the application program 32 and generates an internal command 40. Different types of application programs 32 may be provided to the application parsing part 160. The application parsing part 160 may execute a pre-stored application program 32, or may execute an application program 32 appropriately transmitted from the server device 300.

The control command calculation part 164 calculates a control command at every control cycle T1 according to the motion instruction included in the user program 30. In addition, the control command calculation part 164 calculates a control command at every control cycle T1 according to the internal command 40 sequentially generated by the application parsing part 160.

The sequence program execution part 152 and the control command calculation part 164 execute processing at every control cycle T1 (high priority task). On the other hand, the processing for the application program 32 performed by the application parsing part 160 is executed at every application execution cycle T2 (second cycle) which is an integral multiple of the control cycle T1 (low priority task).

When multiple application programs 32 are processed in the application parsing part 160, the application arbitration part 162 arbitrates the processing order thereof.

The shared memory 170 holds data to be shared among the PLC processing engine 150, the application parsing part 160, and the control command calculation part 164. The shared data may be stored as a structure variable. For example, the internal command 40 generated sequentially by the application parsing part 160 is sequentially written to the structure variable of the shared memory 170.

The shared memory control part 172 performs exclusive control of writing and reading data to and from the shared memory 170 and access to the shared memory 170 corresponding to an external request. For example, the shared memory control part 172 gives the data on the shared memory 170 to the field network interface 176, so as to transmit it to any field instrument 500 connected via the field network 2.

The display function part 174 outputs the data stored in the shared memory 170 and the processing result from the application parsing part 160 to a user, etc.

The field network interface 176 mediates the exchange of data with the field instrument 500 that is connected via the field network 2.

The host network interface 178 mediates the exchange of data with the device that is connected via the host network 6.

E. An Example of Internal Command

Next, an example of the internal command 40 generated by parsing the application program 32 performed by the application parsing part 160 of the control device 100 will be described. Any program described in any language that is executable in an interpreter system can be adopted as the application program 32. However, in the following descriptions, a program defining a trajectory by one or more commands in advance, like an NC program or a robot program is assumed.

Figure 5A:
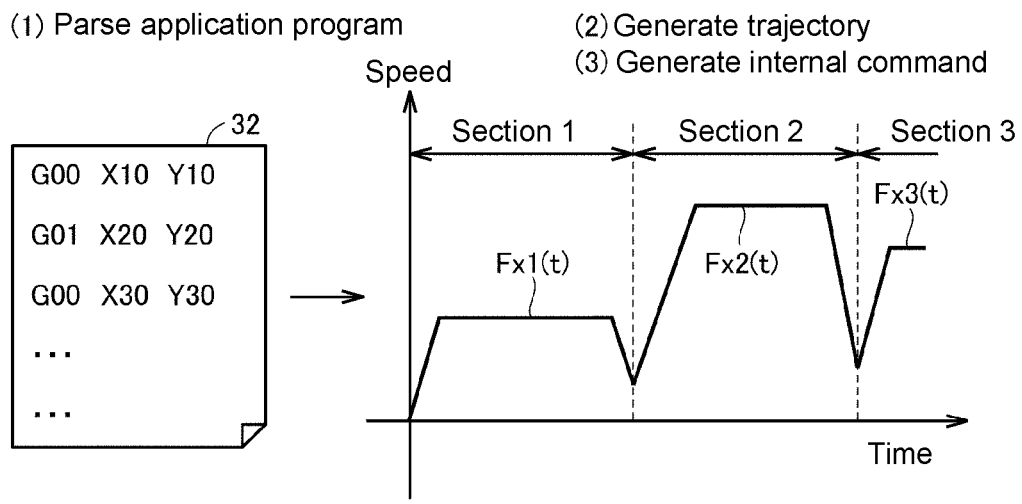
FIG. 5A and FIG. 5B are schematic diagrams for illustrating the generation process of an internal command in the control device according to the embodiment.
Figure 5B:
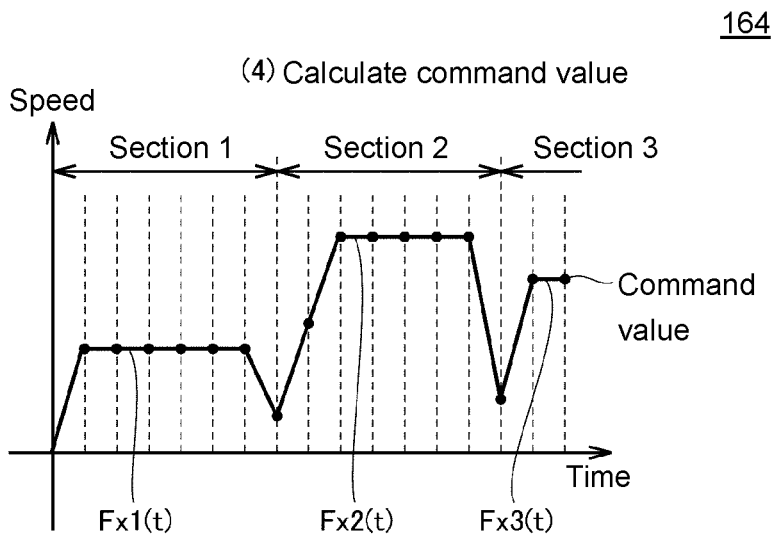

FIG. 5A and FIG. 5B are schematic diagrams for illustrating the generation process of the internal command 40 in the control device 100 according to the embodiment. Referring to FIG. 5A, the application parsing part 160 parses the application program 32, and each instruction included in the application program 32 is parsed ((1) parse application program). By parsing the application program 32, the defined trajectory is generated internally ((2) generate trajectory). Since the application program 32 usually includes an instruction that defines a trajectory for each section, a trajectory is generated for each section corresponding to each instruction.

In the case of defining a group composed of a plurality of axes, a trajectory may be generated for each axis, or a trajectory defining the behavior of all the axes belonging to the group may be generated.

The application parsing part 160 generates the internal command 40 (typically, one or more functions) that indicates the generated trajectory ((3) generate internal command). In the case where the trajectory is defined for each section, the internal command 40 is generated corresponding to each section.

As described above, the application parsing part 160 parses the application program 32 to calculate a passing point on the trajectory, and generates the internal command based on the calculated passing point.

A plurality of sections may be defined by a common internal command 40, or one single section may be further divided to generate respective internal commands 40. In other words, the instructions of the application program 32 or the sections of the trajectory defined by the instructions, and the number of the internal commands 40 generated do not necessarily match each other, and they may be generated arbitrarily. Moreover, the output form of the internal command 40 may be designed appropriately in consideration of the required time width, etc. of the control cycle T1.

As shown in FIG. 5A, the internal command 40 may be a function that defines the relationship between time and an instruction value, for example. In the example shown in FIG. 5A, the internally generated trajectory can be defined by a combination of straight lines. As an example, $Fx1(t)$, $Fx2(t)$, and $Fx3(t)$ can be outputted to indicate the relationship between time and speed of the trajectory of each straight section (section 1 to section 3) with respect to the X axis. For other axes (for example, Y axis and Z axis) belonging to the same group, functions may be outputted respectively in the same manner.

As shown in FIG. 5B, the control command calculation part 164 calculates the control command according to the generated internal command 40 at every control cycle T1, so that the control command is outputted at every control cycle T1 ((4) calculate instruction value). That is, by inputting the time of each control cycle to the function corresponding to each section, the instruction value at that time can be determined uniquely. In the case of setting any group, the instruction value may be synchronized and outputted with respect to each axis belonging to the group.

FIG. 5A and FIG. 5B show an example of the command that is described in the G language used in CNC. However, the invention is not limited thereto. If the program is executed by any interpreter system, any language may be used. In addition, the format of the generated internal command 40 may differ corresponding to the language format to be processed.

F. Execution Timing of Task

Figure 6:
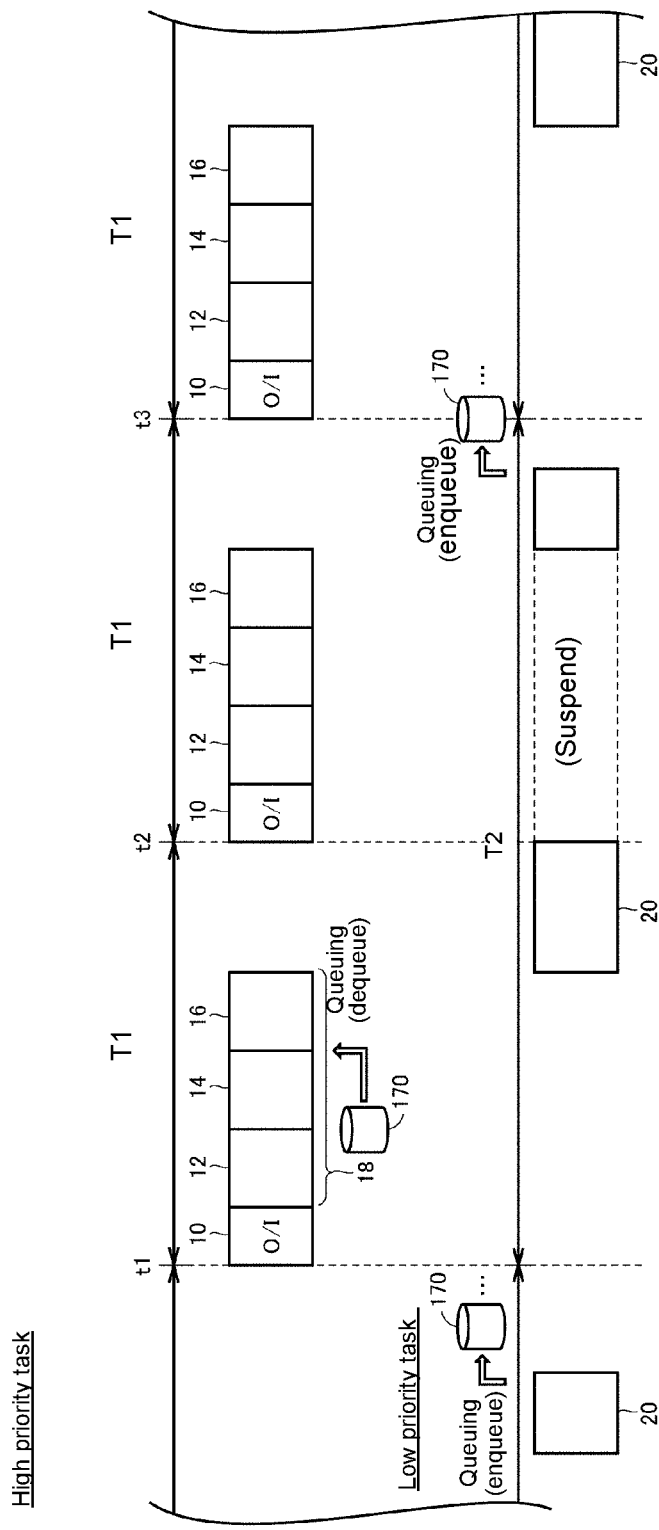
FIG. 6 is a time chart showing an example of task execution timing in the control device according to the embodiment.

Next, an execution timing of each task in the control device 100 according to the embodiment will be described. FIG. 6 is a time chart showing an example of task execution timing in the control device 100 according to the embodiment.

Referring to FIG. 6, a first task 10 (input/output refresh process) and a second task 18 (including the sequence instruction execution process 12, the output process 14 of the control command according to the application program, and the output process 16 of the control command according to the motion instruction included in the user program) are set as high priority tasks. A third task 20 (the process of parsing the application program 32 to sequentially generate the internal command 40) is set as the low priority task.

The high priority task is executed at every control cycle T1. In the output process 14 of the control command according to the application program, the internal command 40 generated by the application parsing part 160 is read (dequeued) from the shared memory 170, and the control command in the control cycle T1 is calculated.

The low priority task is executed at every application execution cycle T2. The application execution cycle T2 is set in the unit of an integral multiple of the control cycle T1 (twice in the example shown in FIG. 6). That is, the application parsing part 160 parses at least a part of the application program 32 to sequentially generate the internal command 40 at every application execution cycle T2. The generated internal command 40 is sequentially queued (enqueued) to a buffer in the shared memory 170.

The process for the low priority task only needs to be completed within the application execution cycle T2. Since the processor resource is not allocated to the low priority task during the period when the high priority task is executed, the low priority task stands by in a suspended state.

The execution timing of each task as shown in FIG. 6, that is, the allocation of the processor resource, is executed by the scheduler 154. The scheduler 154 allocates the processor resource for each task based on the priority set to each task.

G. Change of Priority

Next, a process of changing the priority set to the low priority task will be described. As shown in FIG. 1A and FIG. 1B, a plurality of tasks other than the high priority tasks are executed in parallel, and for these tasks, the processor resource is allocated according to the priorities.

Such low priority tasks share the processor resource with other low priority tasks. On the other hand, since the application program 32 includes commands of an interpreter system, the time required for parsing varies depending on the type and combination of the commands. Therefore, in some cases, the requested parsing process cannot be completed within the application execution cycle T2. The state where the process cannot be completed within the application execution cycle T2 is also referred to as a "task execution cycle excess".

Figure 7:
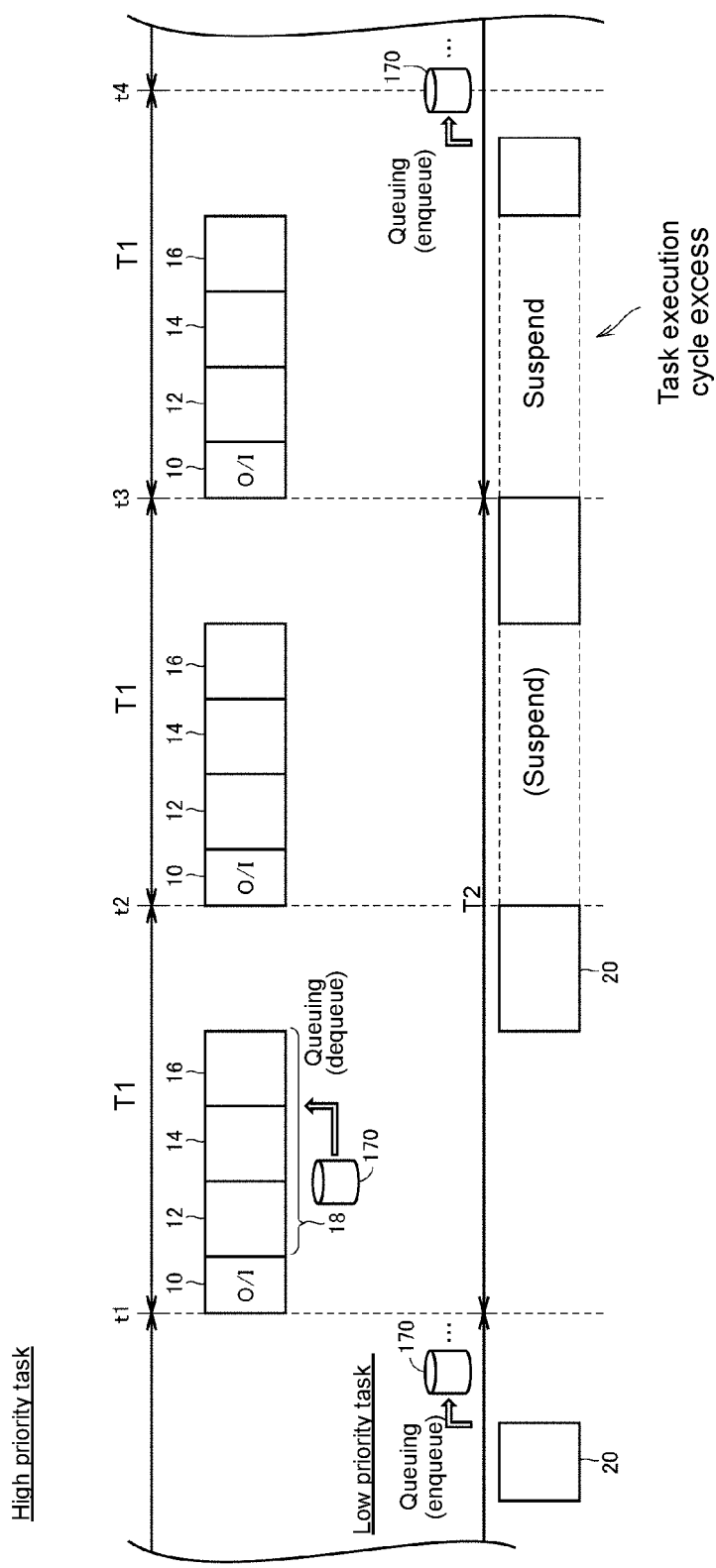
FIG. 7 is a time chart showing an example of a task execution cycle excess of the low priority task in the control device according to the embodiment.

FIG. 7 is a time chart showing an example of a task execution cycle excess of the low priority task in the control device 100 according to the embodiment. Referring to FIG. 7, the processing of the third task 20 started in the application execution cycle T2 that starts from the time t1 cannot be completed by the time t3, i.e., the end of the original cycle, and the processing is completed in the next application execution cycle T2.

When such a task execution cycle excess occurs, measures, such as lengthening the application execution cycle T2 and/or changing to a higher priority, may be taken.

The control device 100 according to the embodiment monitors the processing state of the third task 20 (the parsing process for the application program 32), and when the processing state meets a predetermined condition, changes the priority that has been set to the third task 20 according to the condition. The change according to this condition may include raising the priority or lowering the priority.

Typically, the priority changing part 156 of the control device 100 may raise the priority set to the third task 20 when the aforementioned task execution cycle excess occurs, and after raising the priority, restore the priority when another predetermined condition is met.

The "processing state of the task" for changing the priority is a concept that covers a state which can affect the calculation processing of the control command using the internal command set as a high priority task. The "processing state of the task" may include any information required for avoiding a situation that output of the control command according to the application program 32 at every control cycle T1 cannot be guaranteed.

The priority changing part 156 of the control device 100 determines the processing state of the application parsing part 160 based on the information that indicates the load related to the generation process of the internal command performed by the application parsing part 160. The following information is provided as examples of the information that indicates the load related to the generation process of the internal command.

(1) Time required for processing execution of the low priority task
(2) Whether or not the task execution cycle excess occurs
(3) The number of passing point buffers for generating the internal command
(4) The number of internal command buffers
(5) Special command in the application program A priority changing process based on each information will be described hereinafter.

(g1. Time Required for Processing Execution of the Low Priority Task)

The aforementioned processing state of the task may be based on the time required for the processing execution of the target low priority task. Thus, the information that indicates the load related to the generation process of the internal command may include the time required for parsing of the application program 32 performed by the application parsing part 160.

A last value, a maximum value, a minimum value, an average value, an intermediate value, etc. of the time required from the start to the end of processing of the low priority task can serve as the time required for the processing execution of the low priority task.

Whether or not a task execution cycle excess has occurred on the target low priority task, the number of the task execution cycle excesses that occurred, etc. may also be used.

FIG. 8 is a diagram showing an example of a variable list that shows the time required for the processing execution in the control device 100 according to the embodiment. Referring to FIG. 8, the control device 100 holds information required for the processing execution of a specific task as a system variable.

In the example shown in FIG. 8, a task execution count variable 601 (_CNC_ServiceExecCount), an execution time last value variable 602 (_CNC_ServiceLastExecTime), an execution time maximum value 603 (_CNC_ServiceMaxExecTime), and an execution time minimum value 604 (_CNC_ServiceMinExecTime) are shown as a system variable group 600.

The task execution count variable 601 indicates a total number of times that the target task has been executed since the control device 100 starts (or since any reset timing). The execution time last value variable 602 indicates the time required for processing in the last execution of the target task. The execution time maximum value 603 indicates the maximum value of the time required for executing the task after the control device 100 starts (or after any reset timing). The execution time minimum value 604 indicates the minimum value of the time required for executing the task after the control device 100 starts (or after any reset timing).

The load state, etc. of the target task can be evaluated based on the time required for the processing execution of the low priority task, and the priority of the target task can be changed based on the evaluation result.

For example, a case where the last value of the processing execution of the target task reaches a predetermined ratio (for example, 90%) of the preset application execution cycle T2 can be used as a condition for using the time required for the processing execution as shown in FIG. 8. When this condition is met, the priority of the target task may be raised.

Conversely, a case where the last value of the processing execution of the target task is equal to or less than a predetermined ratio (for example, 30%) of the preset application execution cycle T2 over multiple times can be used. When this condition is met, the priority of the target task may be lowered.

Further, the degree to which the priority of the target task is to be raised may be determined based on the difference or ratio between the length of the application execution cycle T2 and the time required for the processing execution of the target task.

Thus, the load state of the target task can be evaluated directly by monitoring the time required for the processing execution of the low priority task.

(g2. Whether or not the Task Execution Cycle Excess Occurs)

The aforementioned processing state of the task may also be based on whether the task execution cycle excess occurs on the target low priority task. That is, the information that indicates the load related to the generation process of the internal command may include information of whether or not the time required for parsing of the application program 32 performed by the application parsing part 160 exceeds the length of the application execution cycle T2 (second cycle).

Referring to FIG. 8 again, in the system variable group 600, a task execution cycle excess variable 605 (_CNC_ServiceExceeded) and a task execution cycle excess count variable 606 (_CNC_ServiceExceedCount) are further shown. The task execution cycle excess variable 605 indicates whether or not a task execution cycle excess has occurred in the last execution of the target task. The task execution cycle excess count variable 606 indicates the total number of times that the task execution cycle excess has occurred since the control device 100 starts (or since any reset timing).

The load state, etc. of the target task can be evaluated based on whether the task execution cycle excess occurs, and the priority of the target task can be changed based on the evaluation result. In the case of using the information of whether the task execution cycle excess occurs, the priority of the target task may be raised on the condition that the task execution cycle excess occurs in the last execution of the target task.

Conversely, the priority of the target task may be lowered on the condition that the task execution cycle excess does not occur over a predetermined number of times of execution.

Thus, the load state of the target task can be evaluated directly by monitoring occurrence of the task execution cycle excess.

(g3. The Number of Passing Point Buffers for Generating the Internal Command)

The aforementioned processing state of the task may be based on the number of passing point buffers on a target trajectory that is calculated by parsing the application program 32. That is, the information that indicates the load related to the generation process of the internal command may include the number of passing points that the application parsing part 160 calculates in advance for generating the internal command.

Figure 9A:
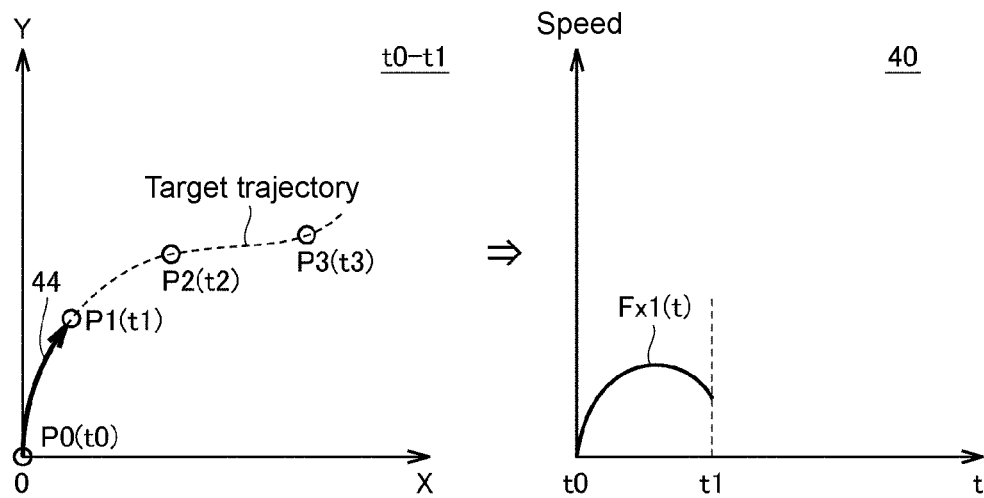
FIG. 9A and FIG. 9B are schematic diagrams for illustrating an example of the generation process of an internal command in the control device according to the embodiment.
Figure 9B:
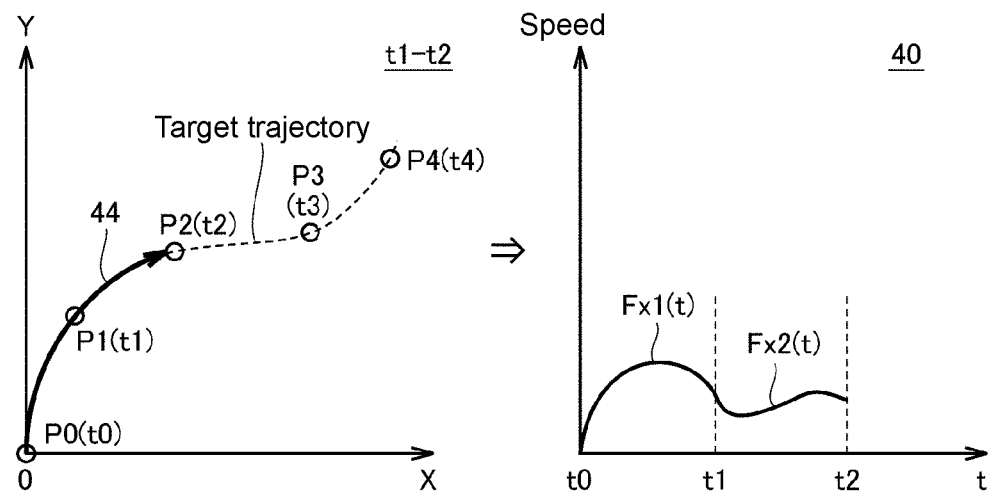

Here, a process of parsing the application program 32 to generate the internal command 40 will be described. FIG. 9A and FIG. 9B are schematic diagrams for illustrating an example of the generation process of the internal command 40 in the control device 100 according to the embodiment. FIG. 9A shows a processing procedure of generating the internal command 40 in the period from the time t0 to the time t1, and FIG. 9B shows a processing procedure of generating the internal command 40 in the period from the time t1 to the time t2.

Referring to FIG. 9A, the application parsing part 160 parses the application program 32 to sequentially determine the target trajectory. The application parsing part 160 sequentially calculates passing points at predetermined intervals with respect to the sequentially determined target trajectory. Each passing point is calculated based on a moving distance on the target trajectory and a moving speed on the target trajectory.

In the example shown in FIG. 9A, in addition to the passing point P0 (t0) which is the initial position at the time t0, the passing point P1 (t1) at the time t1, the passing point P2 (t2) at the time t2, and the passing point P3 (t3) at the time t3 are calculated.

The application parsing part 160 calculates a moving path 44 from the passing point P0 (t0) to the passing point P1 (t1) at least based on the information of the passing point P0 (t0) and the passing point P1 (W. The application parsing part 160 generates an internal command $Fx1(t)$ from the calculated moving path 44. In FIG. 9A, only the internal command $Fx1(t)$ is shown, but the internal command 40 is actually generated corresponding to the number of the motors that need to be controlled at the same time.

In addition to the information of the passing point P0 (t0) and the passing point P1 (t1), the information of one or more passing points following the passing point P1 (t1) may be reflected in the calculation of the moving path 44. By referring to the information of more passing points, the accuracy of generation of the internal command can be improved.

Referring to FIG. 9B, for the period from the time t1 to the time t2, the application parsing part 160 further parses the application program 32 to further determine a further target trajectory. The application parsing part 160 calculates a new passing point P4 (t4) for the further target trajectory that has been further determined.

Then, the application parsing part 160 calculates the moving path 44 from the passing point P1 (t1) to the passing point P2 (t2), based on the information of the passing point P1 (t1) and the passing point P2 (t2). The application parsing part 160 generates an internal command $Fx2(t)$ from the calculated moving path 44. In FIG. 9B, only the internal command $Fx2(t)$ is shown, but the internal command 40 is actually generated corresponding to the number of the motors that need to be controlled at the same time.

By repeating the processing procedure as described above, the internal command 40 for realizing the target trajectory is sequentially generated.

Figure 10:
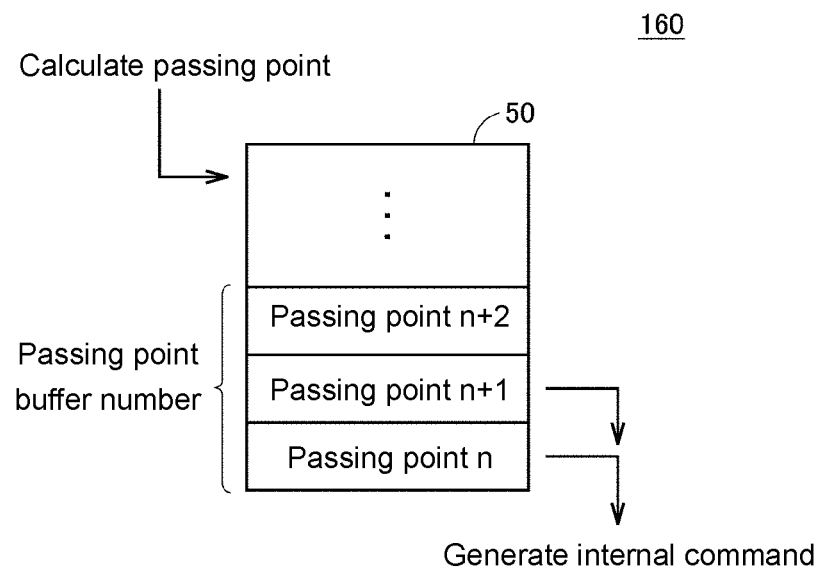
FIG. 10 is a schematic diagram showing an example of processing of a passing point for generating an internal command in the control device according to the embodiment.

FIG. 10 is a schematic diagram showing an example of processing of a passing point for generating the internal command 40 in the control device 100 according to the embodiment. Referring to FIG. 10, a passing point buffer 50 is prepared in the application parsing part 160. Information (typically, coordinate values) of the sequentially calculated passing points is queued (enqueued) according to a calculation order thereof in the passing point buffer 50. From the passing point buffer 50, the information of the passing points is read (dequeued) according to the calculation order, and the corresponding internal command 40 is sequentially generated.

The number of pieces of the information of the passing points stored in the passing point buffer 50 shown in FIG. 10 is also referred to as a "passing point buffer number". The passing point buffer number indicates the likelihood for sequentially generating the internal command 40. That is, as the passing point buffer number increases, even if there is a variation in processing time in the parsing process of the application program 32 performed by the application parsing part 160, the generation process of the internal command 40 can be continued without being suspended.

The load state, etc. of the target task can be evaluated based on the number of passing points stored in the passing point buffer 50 of the application parsing part 160, and the priority of the target task can be changed based on the evaluation result.

In the case of using the number of pieces of information of the passing points (the passing point buffer number) stored in the passing point buffer 50 as shown in FIG. 10, for example, a condition of whether or not the passing point buffer number is lower than a predetermined threshold value can be adopted. When this condition is met, the priority of the target task may be raised.

Conversely, if the passing point buffer number remains higher than the predetermined threshold value over a predetermined period, the priority of the target task may be lowered.

Thus, the load state of the target task can be evaluated by monitoring the number of passing points stored in the passing point buffer 50 of the application parsing part 160.

(g4. The Number of Internal Command Buffers)

The aforementioned processing state of the task may be based on the number of buffers of the internal command 40 generated from the application program 32. That is, the information that indicates the load related to the generation process of the internal command may include the number of internal commands that have not yet been processed by the control command calculation part 164 among the internal commands generated by the application parsing part 160.

The control command calculation part 164 of the control device 100 calculates the control command at every control cycle T1 according to the internal command 40 sequentially generated by the application parsing part 160.

Figure 11:
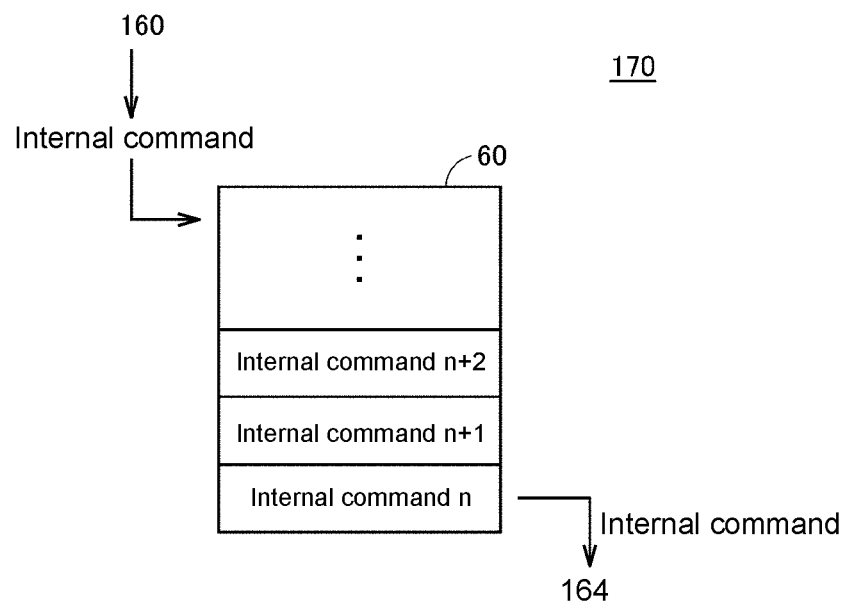
FIG. 11 is a schematic diagram showing an example of processing for calculating a control command from an internal command in the control device according to the embodiment.

FIG. 11 is a schematic diagram showing an example of processing for calculating the control command from the internal command 40 in the control device 100 according to the embodiment. Referring to FIG. 11, in the shared memory 170, an internal command buffer 60 is prepared for storing the internal command sequentially generated by the application parsing part 160. In the internal command buffer 60, the sequentially calculated internal commands are queued (enqueued) according to a generation order thereof. From the internal command buffer 60, the internal commands are read (dequeued) according to the generation order, and used by the control command calculation part 164 for calculation of the control command.

The number of internal commands 40 stored in the internal command buffer 60 shown in FIG. 11 is also referred to as an "internal command buffer number". The internal command buffer number indicates the likelihood for the control command calculation part 164 to calculate the control command at every control cycle T1. That is, as the internal command buffer number increases, even if there is a variation in processing time in the generation process of the internal command 40 performed by the application parsing part 160, the output of the control command can be continued without suspending the calculation process of the control command at every control cycle T1.

The load state, etc. of the target task can be evaluated based on the number of internal commands 40 stored in the internal command buffer 60, and the priority of the target task can be changed based on the evaluation result.

In the case of using the number of internal commands (the internal command buffer number) stored in the internal command buffer 60 as shown in FIG. 11, for example, a condition of whether or not the internal command buffer number is lower than a predetermined threshold value can be adopted. When this condition is met, the priority of the target task may be raised.

Conversely, if the internal command buffer number remains higher than the predetermined threshold value over a predetermined period, the priority of the target task may be lowered.

Thus, the load state of the target task can be evaluated by monitoring the number of internal commands stored in the internal command buffer 60 of the shared memory 170.

(g5. Special Command in the Application Program)

When a special command described in the application program 32 is executed as the aforementioned processing state of the task, the priority of the target task or the related task may be changed based on the special command. That is, the information that indicates the load related to the generation process of the internal command may include the special command explicitly described in the application program 32.

Figure 12A:
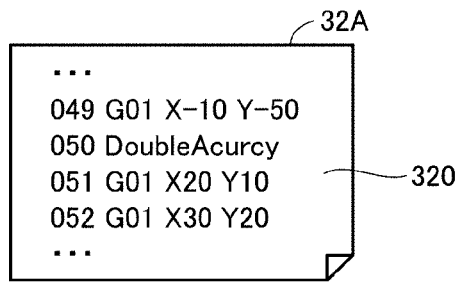
FIG. 12A and FIG. 12B are schematic diagrams showing an example of the application program processed in the control device according to the embodiment.
Figure 12B:
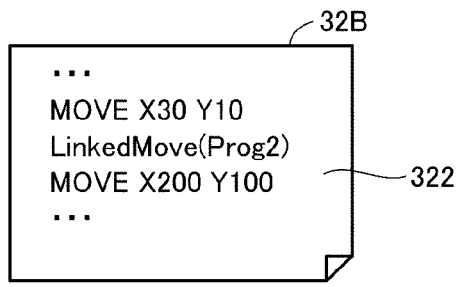

FIG. 12A and FIG. 12B are schematic diagrams showing an example of the application program processed in the control device 100 according to the embodiment. FIG. 12A shows an example of an application program 32A described in the G language, and FIG. 12B shows an example of an application program 32B described in the robot language.

Referring to FIG. 12A, the application program 32A includes a special command 320 in a "050" block. The special command 320 is an instruction for doubling the generation accuracy of the internal command 40. When the application parsing part 160 executes the special command 320, a message is sent to the priority changing part 156. The priority changing part 156 changes the priority with respect to the task processing the application program 32A, based on the content of the message from the application parsing part 160.

Similarly, referring to FIG. 12B, the application program 32B includes a special command 322 in the middle of a series of commands. The special command 322 is an instruction for operating the application program 32B and another application program in conjunction with each other. That is, the processing for another application program is started by executing the special command 322.

When the application parsing part 160 executes the special command 322, a message is sent to the priority changing part 156. The priority changing part 156 changes the priority with respect to the task processing the application program that is newly started from the application program 32B, based on the content of the message from the application parsing part 160. Alternatively, the priority with respect to the task that processes the application program 32B may be changed.

Nevertheless, the application programs 32A and 32B shown in FIG. 12A and FIG. 12B are merely examples, and any special command may be defined.

Thus, by explicitly defining the special command in the application program to be processed by the application parsing part 160, it is possible to change the priority of the task that processes the application program in advance, and realize accurate priority adjustment with estimation of the future load of the target task.

(g6. Others)

The above descriptions illustrate multiple factors that can be the information indicating the load related to the generation process of the internal command. However, it is also possible to use only one of these factors or use any of these factors in combination. Furthermore, when multiple factors are combined, weighting corresponding to the factors may be applied. As a form of utilization of these factors, a method corresponding to the state can be applied.

H. Processing Procedure Related to Change of Priority

Figure 13:
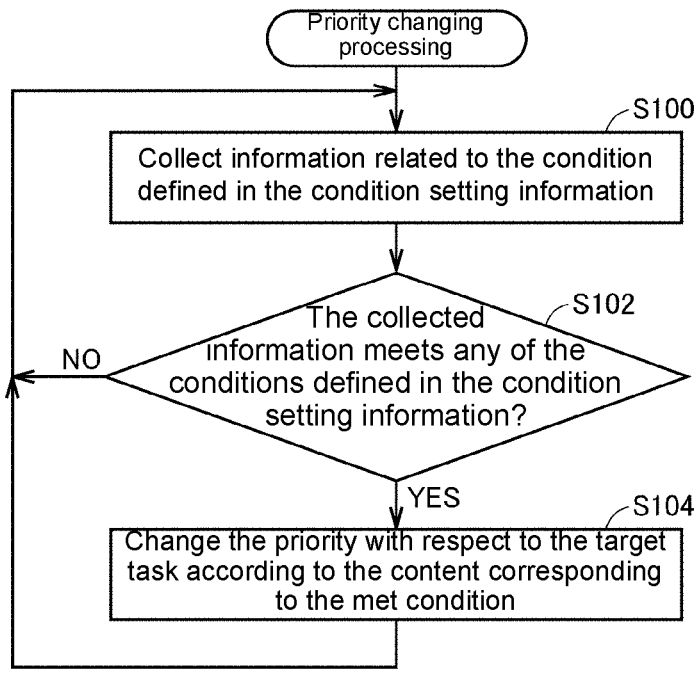
FIG. 13 is a flowchart showing a processing procedure of priority change in the control device according to the embodiment.

Next, a processing procedure related to change of the priority set to the low priority task will be described. FIG. 13 is a flowchart showing the processing procedure of priority change in the control device 100 according to the embodiment. Typically, each step shown in FIG. 13 is realized by execution of the system program 34 performed by the processor 102 of the control device 100.

Referring to FIG. 13, the priority changing part 156 of the PLC processing engine 150 collects information related to the condition defined in the condition setting information 158 (Step S100). Then, the priority changing part 156 determines whether the collected information meets any of the conditions defined in the condition setting information 158 (Step S102).

If the collected information does not meet any of the conditions defined in the condition setting information 158 (NO in Step S102), the processing starting from Step S100 is repeated.

On the other hand, if the collected information meets any of the conditions defined in the condition setting information 158 (YES in Step S102), the priority changing part 156 changes the priority with respect to the target task according to the content corresponding to the met condition (Step S104). Then, the processing starting from Step S100 is repeated.

For example, a series of processes as shown in FIG. 13 may be repeatedly executed at every control cycle T1.

I. Priority Arbitration Among Multiple Application Programs

For convenience, the above descriptions illustrate a case where one application program 32 is executed in the control device 100 as an example. However, a plurality of application programs 32 can be executed in parallel. In that case, in addition to changing the priority with respect to the task that processes each application program, the priorities of the tasks that process the respective application programs may also be changed relatively (that is, arbitration of the priority).

Figure 14:
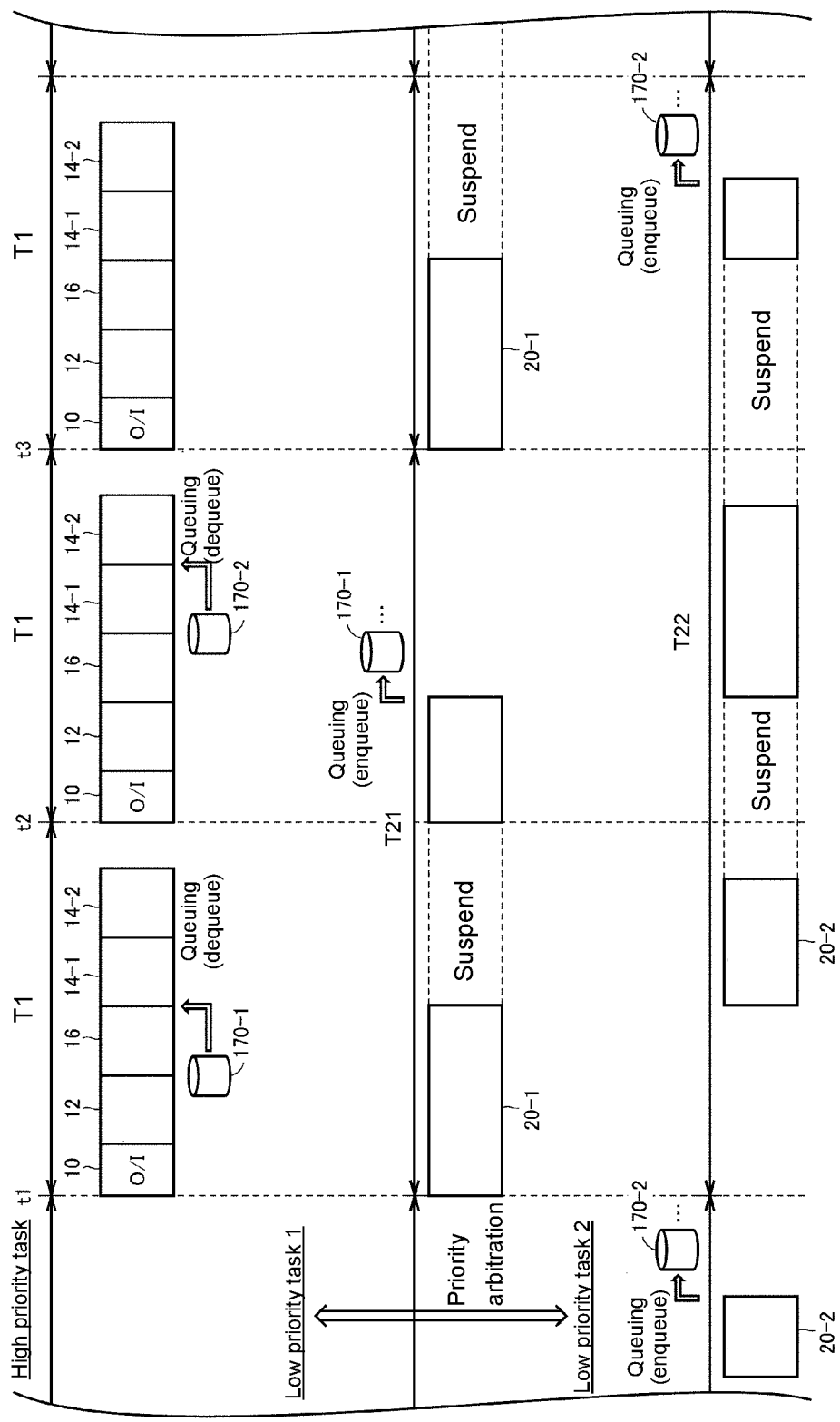
FIG. 14 is a time chart showing an example of execution timing when a plurality of application programs are executed in parallel in the control device according to the embodiment.

FIG. 14 is a time chart showing an example of execution timing when a plurality of application programs are executed in parallel in the control device 100 according to the embodiment. The time chart shown in FIG. 14 shows an example that an application program 1 parsed at every application execution cycle T21 and an application program 2 parsed at every application execution cycle T22 are executed in parallel.

Referring to FIG. 14, in addition to the first task 10 (input/output refresh process), the sequence instruction execution process 12, the output process 16 of the control command according to the motion instruction included in the user program, an output process 14-1 of a control command according to the application program 1, and an output process 14-2 of a control command according to the application program 2 are set as high priority tasks.

The parsing of the application program 1 and the parsing of the application program 2 are set as low priority tasks.

In the example shown in FIG. 14, independent processor resources can be allocated to the high priority tasks and the low priority tasks respectively.

More specifically, the application parsing part 160 parses at least a part of the application program 1 at every application execution cycle T21 (twice the control cycle in the example shown in FIG. 14) to sequentially generate the internal command 40. The generated internal command 40 is sequentially queued (enqueued) to the buffer in a shared memory 170-1.

In addition, the application parsing part 160 parses at least a part of the application program 2 at every application execution cycle T22 (twice the control cycle in the example shown in FIG. 14) to sequentially generate the internal command 40. The generated internal command 40 is sequentially queued (enqueued) to the buffer in a shared memory 170-2.

Two application parsing parts 160 that are independent of each other may be prepared for processing the application program 1 and the application program 2 respectively.

In such a configuration, a common processor resource is shared by the low priority tasks. That is, the processor resource for the low priority tasks is allocated based on the relative relationship between the priorities respectively set to the low priority tasks. Therefore, the priority changing process as described above may be applied to each task that is set as a low priority task or be applied for making an adjustment to the relative relationship between the priorities of the tasks.

Regarding making an adjustment to the relative relationship between the priorities of the tasks, for example, when the condition for raising the priority of one task is met, the priority of the task may be raised, but the priority of another task may be lowered. That is, when the condition that one of the tasks should be preferentially processed is met, the priority of the target task may be set relatively higher than the priorities of other tasks, and the implementation method thereof is not particularly limited.

Thus, in the case where a plurality of tasks are set as the low priority tasks, arbitration may be performed between the priorities of the tasks. In other words, in the case where the application parsing part 160 performs parsing respectively on multiple application programs 32 to sequentially generate the respective internal commands, the priority changing part 156 may change the priorities of multiple tasks respectively associated with the parsing of the application programs 32. Such arbitration of priorities may be realized by conjunction of the application arbitration part 162 and the priority changing part 156 (both are shown in FIG. 4).

J. Overlap Operation

Next, an overlap operation among multiple control applications using the control device 100 according to the embodiment will be described.

Figure 15:
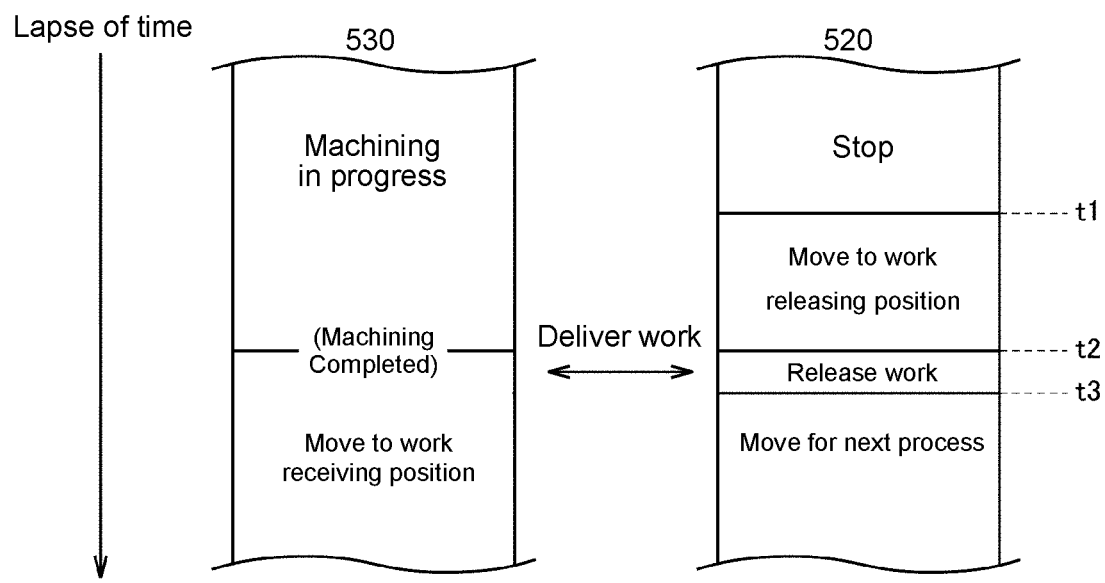
FIG. 15 is a schematic diagram for illustrating an overlap operation provided by the control device according to the embodiment.

FIG. 15 is a schematic diagram for illustrating the overlap operation provided by the control device 100 according to the embodiment. FIG. 15 shows an application example for a configuration that includes the robot 520 and the CNC machine tool 530 as shown in FIG. 2, for example. As a specific operation, the robot 520 picks up the workpiece W conveyed by the conveyor 544 and places it inside the CNC machine tool 530. The CNC machine tool 530 performs a machining process on the workpiece W. Then, the robot 520 takes the workpiece W out of the CNC machine tool 530 and places the workpiece W at a receiving position of the next process.

In order to improve the productivity, for example, in such a series of operations, the robot 520 may be moved to a take-out position of the workpiece W before the machining performed on the workpiece W in the CNC machine tool 530 is completed. That is, the CNC machine tool 530 and the robot 520 need to be operated in parallel in a state of a certain relationship. The operation of multiple control applications in the state of a certain relationship is also referred to as the "overlap operation" hereinafter.

More specifically, the "overlap operation" includes a state, in which after the operation according to an application program starts, the operation according to another application program follows and starts. A condition for starting the operation according to another application program (or referred to as an "overlap condition" hereinafter) includes the lapse of a predetermined time after the operation starts, arrival at a predetermined position, etc.

FIG. 15 shows an example of the operation immediately before the machining performed on the workpiece W in the CNC machine tool 530 is completed. If the machining process of the workpiece W in the CNC machine tool 530 is completed at a time t2, the robot 520 may take out the workpiece W which has been machined at the time t2. Therefore, the robot 520 starts to operate from a time t1 so that the robot 520 can arrive at a workpiece take-out position of the CNC machine tool 530 at the time t2. Then, the robot 520 takes out the workpiece W at the time t2 and starts to move to the next process from a time t3. Meanwhile, as soon as the workpiece W is taken out by the robot 520, the CNC machine tool 530 starts to move to the receiving position for receiving a new workpiece W.

Thus, the productivity can be improved by linking the CNC machine tool 530 and the robot 520 to each other and operating the CNC machine tool 530 and the robot 520 in parallel.

The configuration and processing for realizing the overlap operation will be described hereinafter. The "overlap operation" in this specification may cover a case where a plurality of control applications start operating at the same time with any timing as a reference.

Figure 16:
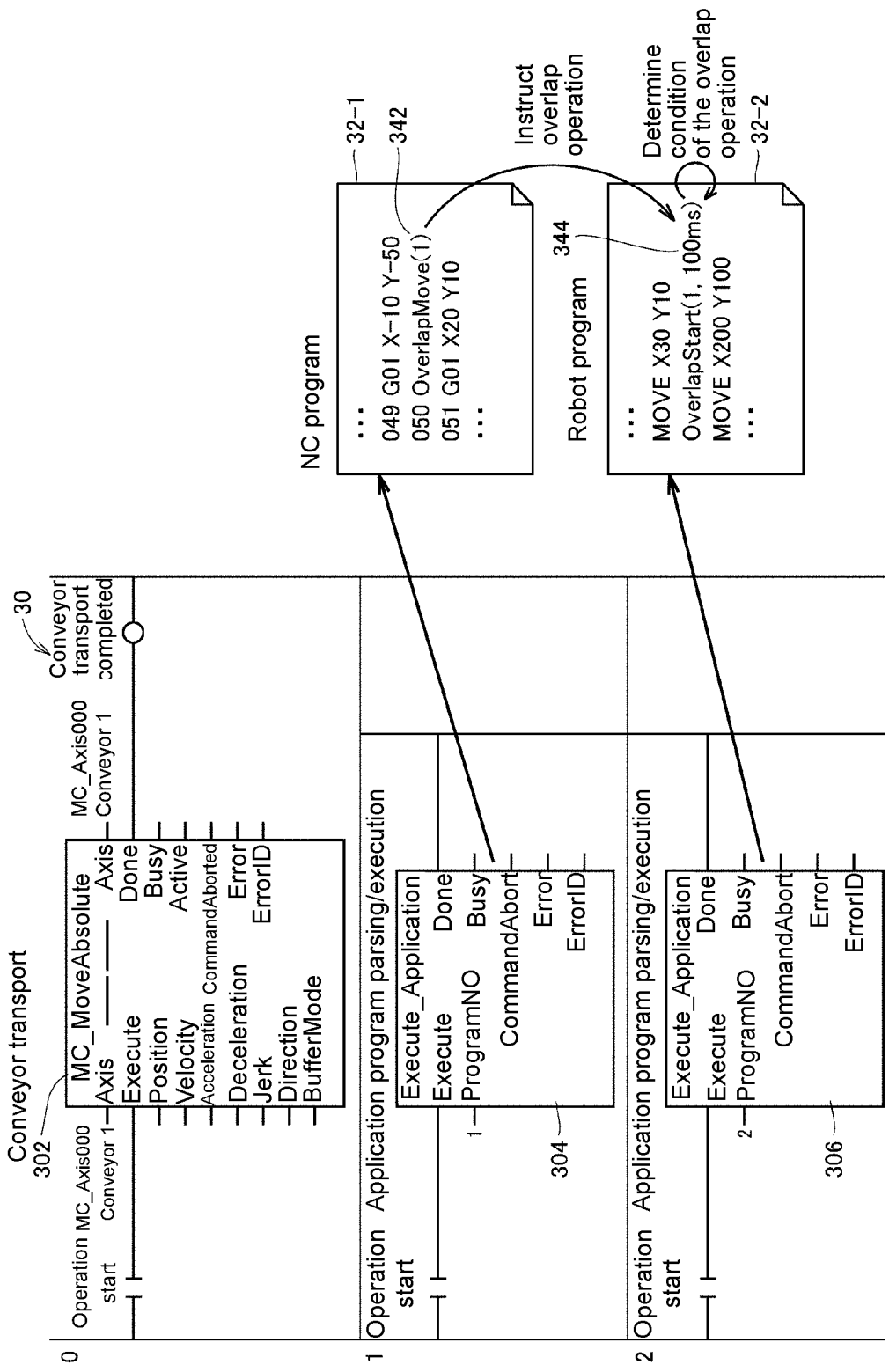
FIG. 16 is a schematic diagram showing an example of the program for realizing the overlap operation in the control device according to the embodiment.

FIG. 16 is a schematic diagram showing an example of the program for realizing the overlap operation in the control device 100 according to the embodiment. The user program 30 shown in FIG. 16 is directed to the control of the conveyor 544, the CNC machine tool 530, and the robot 520 shown in FIG. 2.

More specifically, the user program 30 includes a function block 302 that defines the motion instruction for controlling the servo motor 542 that drives the conveyor 544, a function block 304 that instructs start of execution of an application program 32-1 (NC program) for controlling the CNC machine tool 530, and a function block 306 that instructs start of execution of an application program 32-2 (robot program) for controlling the robot 520.

Each of the function blocks 302, 304, and 306 executes a specified process when an operation start flag becomes TRUE.

A special command for performing the overlap operation is added to the application program 32-1 and the application program 32-2. FIG. 16 shows an example of overlapping "MOVE X200 Y100" defined in the third line of the application program 32-2 with the operation according to the command "G01 X-10 Y-50" defined in the 049 block of the application program 32-1.

In order to realize the overlap operation, a special command 342 is defined immediately after the command ("G01 X-10 Y-50" in the 049 block) that defines the preceding operation. In addition to the instruction "OverlapMove", the special command 342 is added with identification information ("1" as an argument in the example shown in FIG. 16) for specifying the instruction.

On the other hand, a special command 344 is defined in the application program 32-2 immediately before the command ("MOVE X200 Y100" in the example shown in FIG. 16) that defines the operation to be overlapped. In addition to the instruction "OverlapStart", the special command 344 is added with identification information ("1" in the example shown in FIG. 16) for specifying the instruction and an overlap condition ("100 ms" in the example shown in FIG. 16). Besides time and position, any information can be used as the overlap condition.

Figure 17:
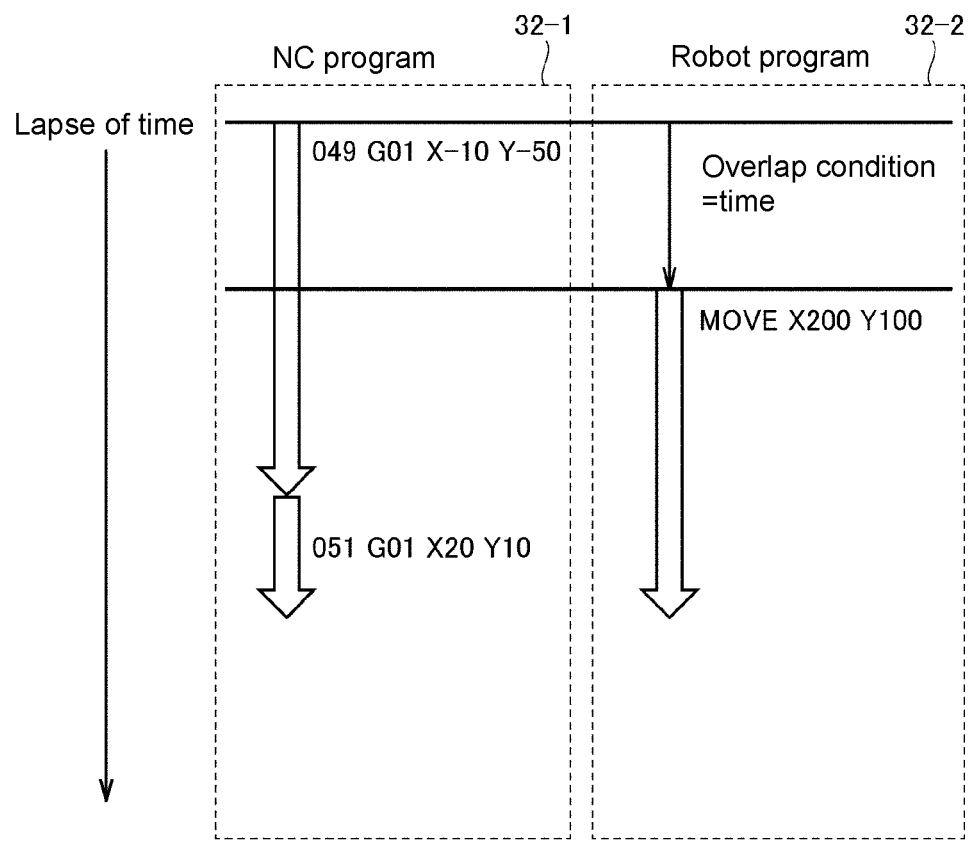
FIG. 17 is a schematic diagram showing an example of the overlap operation when time is set as the overlap condition.

FIG. 17 is a schematic diagram showing an example of the overlap operation when time is set as the overlap condition. Referring to FIG. 17, after the operation according to the command described in the 049 block of the application program 32-1 starts, the operation according to the command "MOVE X200 Y100" of the application program 32-2 starts when "100 ms" which is the overlap condition lapses. That is, the operation according to the application program 32-2 starts when the time defined in the overlap condition has lapsed after the start of the operation specified by the application program 32-1, so that they can overlap and operate with each other.

Figure 18:
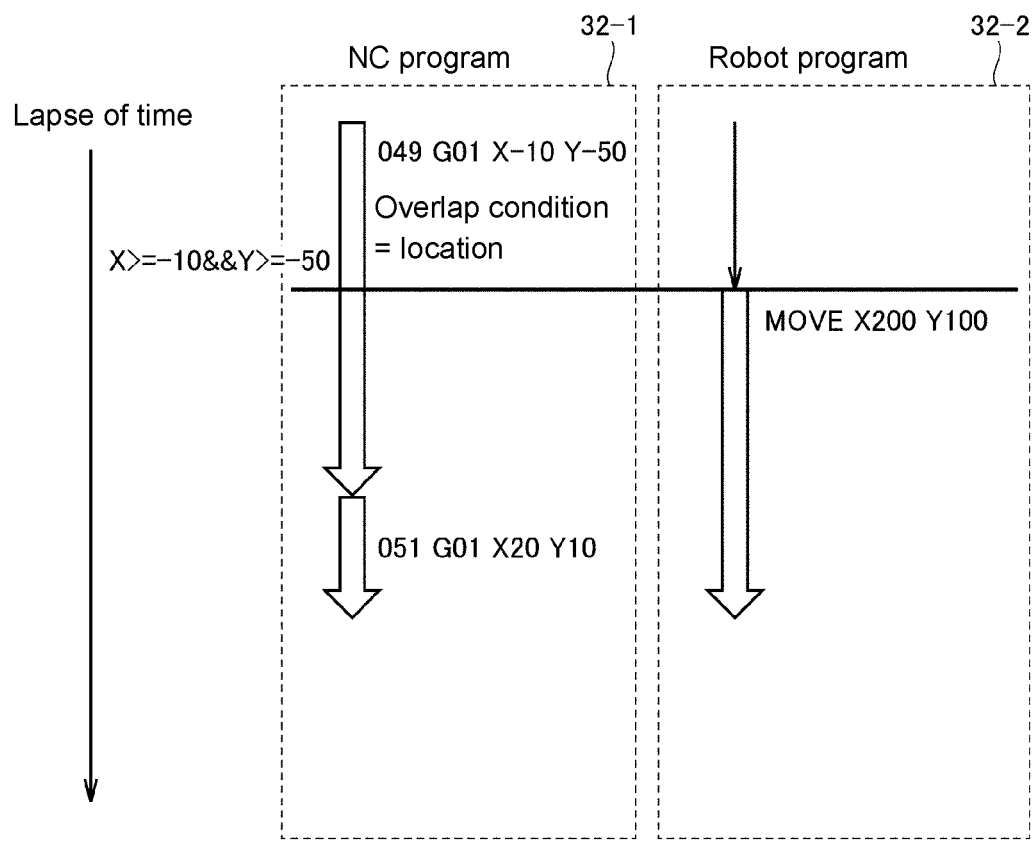
FIG. 18 is a schematic diagram showing an example of the overlap operation when position is set as the overlap condition.

FIG. 18 is a schematic diagram showing an example of the overlap operation when position is set as the overlap condition. Referring to FIG. 18, after the operation according to the command described in the 049 block of the application program 32-1 starts, the operation according to the command "MOVE X200 Y100" of the application program 32-2 starts on the condition of arrival at a predetermined position (or entry into a predetermined range), which is the overlap condition. That is, the operation according to the application program 32-2 starts when the condition of the position defined in the overlap condition is met after the start of the operation specified by the application program 32-1, so that they can overlap and operate with each other.

Figure 19:
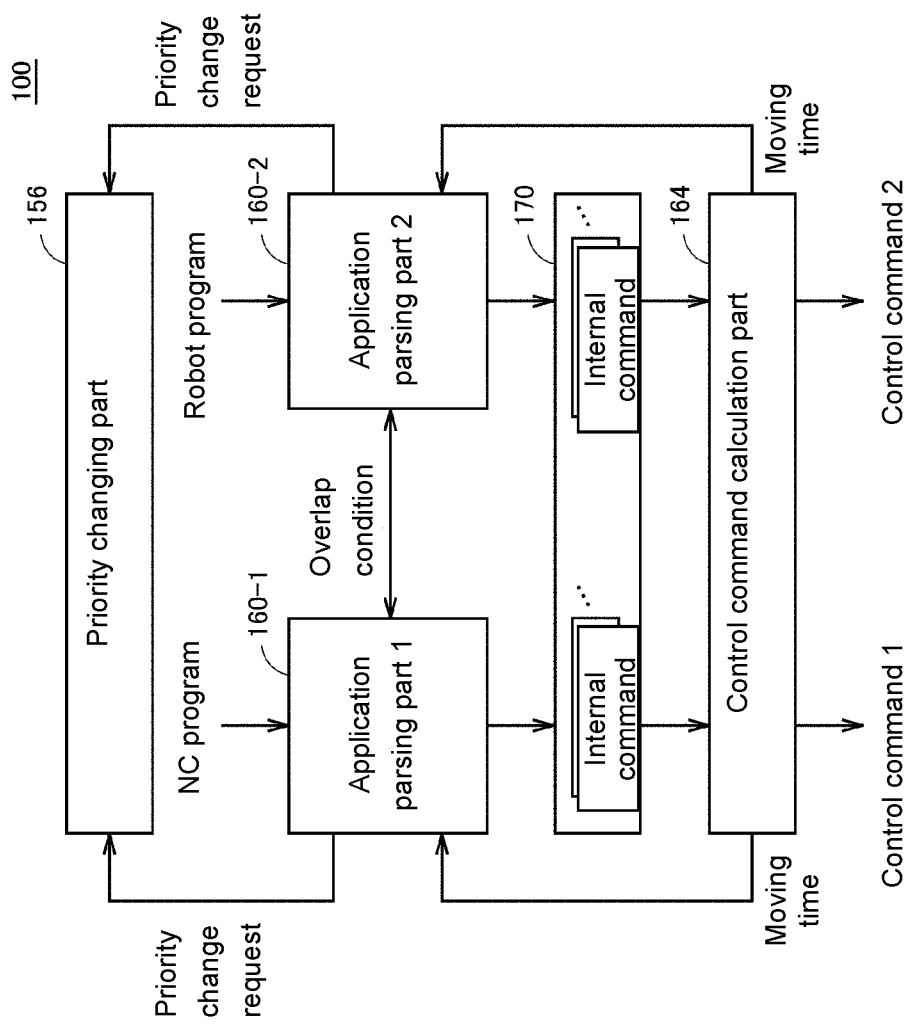
FIG. 19 is a schematic diagram showing the functional configuration for realizing the overlap operation in the control device according to the embodiment.

FIG. 19 is a schematic diagram showing a functional configuration for realizing the overlap operation in the control device 100 according to the embodiment. Referring to FIG. 19, the control device 100 has two application parsing parts 160-1 and 160-2. The application parsing parts 160-1 and 160-2 process the NC program and the robot program respectively.

The internal commands generated by parsing of the application program performed by the application parsing parts 160-1 and 160-2 are sequentially stored in the shared memory 170. The control command calculation part 164 sequentially reads the internal commands sequentially stored in the shared memory 170 and outputs a control command 1 and a control command 2.

The control command calculation part 164 can determine the length of the time required for processing the read internal command. For example, each internal command is a function that defines the relationship between time and the control command with respect to a certain time range, and by referring to the time range that can be inputted to the function, it is possible to calculate the time required for reaching the specified target position.

The control command calculation part 164 can sequentially calculate the time required for processing the internal command that is currently executed, that is, a moving time required for moving from the current position to the specified target position. The control command calculation part 164 sequentially outputs the sequentially calculated moving times to the application parsing parts 160-1 and 160-2.

The application parsing parts 160-1 and 160-2 can parse the commands included in the application program to a certain extent (that is, look ahead) to know in advance the existence of the special command that is for instructing the overlap operation.

Moreover, information related to the overlap operation (typically, the overlap condition) may be exchanged between the application parsing part 160-1 and the application parsing part 160-2.

When the process proceeds right before the line where the special command for instructing the overlap operation exists, the application parsing parts 160-1 and 160-2 determine whether the overlap condition can be met based on the moving time from the control command calculation part 164. That is, the application parsing parts 160-1 and 160-2 can know at what time point the overlap operation needs to be started.

If it is determined in advance that the overlap operation cannot be started based on the specified overlap condition, the application parsing parts 160-1 and 160-2 send a request (priority change request) to the priority changing part 156, so as to raise the priority of the low priority task that includes the parsing process of the application parsing parts 160-1 and 160-2. As a result, more processor resource is allocated for the parsing of the application program performed by the priority changing part 156, so that the overlap operation can be started at the specified timing.

In other words, the parsing process of the required application program can be completed before the time of start of the overlap operation.

As described above, by dynamically changing the priority of the task related to the parsing of the application program, the overlap operation can be executed reliably.

Generally, the application program for controlling the CNC machine tool and the application program for controlling the robot are described in a language of the interpreter system which sequentially executes the program line by line. For programs of such an interpreter system, the moving distance, etc. specified by each command varies depending on the type of the command and the argument, etc., so the time required for processing each line differs from command to command.

In addition, in the case of controlling the CNC machine tool and the robot respectively with dedicated controllers, it would be difficult to realize a dense overlap operation under the influence of the control cycle of each controller, the communication cycle between the controllers, etc.

In contrast thereto, in the control device 100 according to the embodiment, multiple application programs can be parsed respectively to output the control commands at every control cycle, and the synchronous operation or the overlap operation between the applications can be performed.

With such synchronous operation or the overlap operation, the production device, in which the CNC machine tool and the robot are linked, can be operated more efficiently, and the production capacity can be increased.

K. Appendix

The embodiment described above includes the following technical concepts.

[Configuration 1]

A control device (100) having one or more processors, the control device comprising:

a storage part (108) storing a first program (30) that is scanned as a whole for every execution and a second program (32) that is executed sequentially;

a program execution part (152) executing the first program at every first cycle to output a first control command;

a parsing part (160) parsing at least a part of the second program at every second cycle, which is longer than the first cycle, to sequentially generate an internal command;

a command calculation part (164) outputting a second control command at every first cycle according to the internal command generated by the parsing part;

a scheduler (154) allocating a processor resource to one or more tasks based on a preset priority, wherein at least a first task that has a first priority comprising processing execution performed by the program execution part and the command calculation part, a second task that has a second priority, lower than the first priority, comprising processing execution performed by the parsing part, and a third task that has a third priority comprising execution of a processing content different from the first task and the second task are set in the scheduler; and a priority changing part (156) monitoring a processing state of the parsing part, and when the processing state of the parsing part meets a predetermined condition, changing the second priority that has been set to the second task according to the condition.

[Configuration 2]

The control device according to configuration 1, wherein the priority changing part determines the processing state of the parsing part based on information that indicates a load related to a generation process of the internal command performed by the parsing part.

[Configuration 3]

The control device according to configuration 2, wherein the information that indicates the load comprises a time (602; 603; 604) required for parsing of the second program performed by the parsing part.

[Configuration 4]

The control device according to configuration 2 or 3, wherein the information that indicates the load comprises information (605) of whether the time required for parsing of the second program performed by the parsing part exceeds a length of the second cycle.

[Configuration 5]

The control device according to any of configurations 2 to 4, wherein the parsing part is configured to parse the second program to calculate a passing point on a trajectory and generate the internal command based on the calculated passing point, wherein the information that indicates the load comprises a number of passing points that the parsing part calculates in advance for generating the internal command.

[Configuration 6]

The control device according to any of configurations 2 to 5, wherein the information that indicates the load comprises a number of internal commands, which have not yet been processed by the command calculation part, among the internal commands generated by the parsing part.

[Configuration 7]

The control device according to any of configurations 2 to 6, wherein the information that indicates the load comprises a special command described in the second program.

[Configuration 8]

The control device according to any of configurations 1 to 7, wherein the priority changing part raises the second priority that has been set to the second task, and then restores the second priority when another predetermined condition is met.

[Configuration 9]

The control device according to any of configurations 1 to 8, wherein the parsing part is configured to execute parsing on a plurality of the second programs respectively to sequentially generate respective internal commands, wherein the priority changing part changes priorities of a plurality of the second tasks associated with the parsing of the second programs.

L. Advantages

By scheduling the processor resource, the control device according to the embodiment can execute one or more application programs in parallel in addition to the user program that includes the sequence instruction and the motion instruction. Since the control command can be outputted at every control cycle in such parallel execution, it is possible to realize the same control accuracy in the control according to the application program and the control according to the user program.

The control device according to the embodiment parses the application program that is composed of one or more commands described in a language of the interpreter system to generate the internal command, and calculates the control command based on the generated internal command. The parsing process of the application program and the calculation process of the control command need to be executed in conjunction with each other. Therefore, the control device according to the embodiment dynamically changes the priority set to the task of the parsing according to the load state of the process related to the parsing of the application program. Thus, even when processing application programs with different required times for parsing the commands, it is still possible to guarantee the output of the control command at every control cycle.

The control device according to the embodiment can realize the overlap operation, that is, after a lapse of start of the operation according to one of a plurality of application programs, the operation according to another application program is started. In order to realize such an overlap operation, the control device changes the priority of the task as required so that generation of the required internal command can be completed in advance. By realizing the overlap operation while utilizing dynamic change of the priority of the task, the equipment can operate more efficiently and thereby the production efficiency can be improved.

The embodiments disclosed herein are exemplary in all aspects and should not be construed restrictive. The scope of the invention is defined by the claims instead of the above descriptions, and it is intended to include the equivalent of the scope of the claims and all modifications within the scope.

What is claimed is:

1. A control device comprising:
   a storage device storing a first program that is entirely scanned for every execution and a second program that is executed sequentially; and
   one or more processors, configured to:
      execute the first program at every first cycle to output a first control command;
      parse at least a part of the second program at every second cycle, which is longer than the first cycle, to sequentially generate an internal command;
      output a second control command at every first cycle according to the internal command;
      execute a scheduler to allocate a processor resource to one or more tasks based on a preset priority, wherein at least a first task that has a first priority comprising processing execution performed by the program execution and the command calculation by the processor, a second task that has a second priority, lower than the first priority, comprising processing execution performed by the parsing by the processor, and a third task that has a third priority comprising execution of a processing content different from the first task and the second task are set in the scheduler; and
      monitor a processing state of the parsing, and when the processing state of the parsing meets a predetermined condition, change the second priority based on a ratio between a length of the second cycle and a time required for the processing execution of the second task according to the condition,
   wherein the processor determines the processing state of the parsing based on information that indicates a load related to a generation process of the internal command, and
   wherein the information that indicates the load comprises information of whether a time required for parsing of the second program performed by the processor exceeds the length of the second cycle.

2. The control device according to claim 1, wherein the processor is configured to parse the second program to calculate a plurality of passing points on a trajectory of a robot at a plurality of times and generate the internal command based on the calculated passing point,
   wherein the information that indicates the load comprises a number of the passing points that the processor calculates in advance for generating the internal command.

3. The control device according to claim 2, wherein the information that indicates the load comprises a number of internal commands, which have not yet been processed by the processor, among the internal commands generated by the processor.

4. The control device according to claim 1, wherein the information that indicates the load comprises a number of internal commands, which have not yet been processed by the processor, among the internal commands generated by the processor.

5. The control device according to claim 1, wherein the information that indicates the load comprises a special command described in the second program,
   wherein when the special command described in the second program is executed, the processor changes the second priority of the second task or the priority of the task related to the second task.

6. The control device according to claim 1, wherein the processor raises the second priority that has been set to the second task, and then restores the second priority when another predetermined condition is met.

7. The control device according to claim 1, wherein the processor is configured to execute parsing on a plurality of the second programs respectively to sequentially generate respective internal commands,
   wherein the processor changes priorities of a plurality of the second tasks associated with the parsing of the second programs.

* * * * *